US008108021B2

(12) United States Patent
Vance

(10) Patent No.: US 8,108,021 B2
(45) Date of Patent: Jan. 31, 2012

(54) COMMUNICATIONS STRUCTURES INCLUDING ANTENNAS WITH FILTERS BETWEEN ANTENNA ELEMENTS AND GROUND SHEETS

(75) Inventor: Scott LaDell Vance, Staffanstorp (SE)

(73) Assignee: Sony Ericsson Mobile Communications AB, Lund (SE)

( * ) Notice: Subject to any disclaimer, the term of this patent is extended or adjusted under 35 U.S.C. 154(b) by 19 days.

(21) Appl. No.: 12/788,714

(22) Filed: May 27, 2010

(65) Prior Publication Data

US 2011/0294537 A1 Dec. 1, 2011

(51) Int. Cl.
*H04M 1/00* (2006.01)

(52) U.S. Cl. .................. 455/575.7; 455/575.5; 343/841; 343/846

(58) Field of Classification Search ............... 455/575.5, 455/575.7, 269, 271, 129; 343/722, 772, 343/787, 795, 841, 846
See application file for complete search history.

(56) References Cited

U.S. PATENT DOCUMENTS

| | | | |
|---|---|---|---|
| 5,434,579 A | 7/1995 | Kagoshima et al. | |
| 5,684,492 A | 11/1997 | Kagoshima et al. | |
| 5,926,139 A | 7/1999 | Korisch | |
| 6,166,694 A | 12/2000 | Ying | |
| 6,229,487 B1 | 5/2001 | Sadler et al. | |
| 6,535,170 B2 | 3/2003 | Sawamura et al. | |
| 6,646,610 B2 | 11/2003 | Troelsen | |
| 6,677,905 B2 | 1/2004 | Deguchi et al. | |
| 6,738,023 B2 | 5/2004 | Scott et al. | |
| 6,980,154 B2 | 12/2005 | Vance et al. | |
| 7,162,264 B2 | 1/2007 | Vance | |
| 7,265,731 B2 * | 9/2007 | Vance et al. | 343/860 |
| 7,605,766 B2 | 10/2009 | Dahlstrom | |
| 2002/0003499 A1 | 1/2002 | Kouam et al. | |
| 2002/0130816 A1 | 9/2002 | Boyle | |
| 2003/0103010 A1 | 6/2003 | Boyle | |
| 2005/0024273 A1 | 2/2005 | Hayes | |
| 2008/0214136 A1 | 9/2008 | Hayes et al. | |

FOREIGN PATENT DOCUMENTS

| | | |
|---|---|---|
| DE | 201 14 387 U1 | 8/2001 |
| EP | 0 777 295 | 6/1997 |
| EP | 1 026 774 A2 | 1/2000 |
| EP | 1 052 723 A2 | 5/2000 |
| EP | 1 052 722 | 11/2000 |
| EP | 1 154 518 A2 | 5/2001 |
| EP | 1 168 495 A2 | 1/2002 |
| JP | 10093332 | 4/1998 |
| JP | 2000068736 | 3/2000 |

(Continued)

OTHER PUBLICATIONS

Dou, Wei Ping et al., Novel Meandered Planar Inverted-F Antenna for Triple-Frequency Operation, Microwave and Optical Technology Letters, Oct. 5, 2000, pp. 58-60, vol. 27, No. 1, Singapore.

(Continued)

*Primary Examiner* — Christian Hannon
(74) *Attorney, Agent, or Firm* — Myers Bigel Sibley & Sajovec, P.A.

(57) ABSTRACT

A communications structure may include a ground sheet, a feed conductor, and an active antenna branch electrically coupled to the feed conductor. A parasitic antenna branch may be electrically coupled to the ground sheet, and the active and parasitic antenna branches may be spaced apart. Moreover, the parasitic antenna branch may be between portions of the active antenna branch and the ground sheet.

20 Claims, 12 Drawing Sheets

FOREIGN PATENT DOCUMENTS

| | | |
|---|---|---|
| WO | WO 00/36700 | 6/2000 |
| WO | WO 01/33665 | 5/2001 |
| WO | WO 02/054534 | 7/2002 |

OTHER PUBLICATIONS

Ollikainen, Jani et al., Internal Dual-Band Patch Antenna for Mobile Phones,Helsinki University of Technology, Finland, date unknown, but for examination purposes, the date is before Dec. 17, 2002, p. 364 (4 sheets).

Wong, Kin-Lu, Chapter One, Introduction and Overview, Planar Antennas for Wireless Communications, Jan. 2003, pp. 1-25, ISBN: 0-471-26611-6.

Sager et al. "A Novel Technique to Increase the Realized Efficiency of a Mobile Phone Antenna Placed Beside a Head-Phantom," IEEE 2003.

Chiu et al., *Compact dual-band PIFA with multi-resonators*, Electronics Letters, vol. 38, No. 12, 2 sheets, Jun. 6, 2002.

Patent Abstract of Japan, vol. 1998, No. 09, Publication No. 10093331, *Microstrip Antenna System*, 1 sheet, Publication Date Oct. 4, 1998.

Invitation to Pay Additional Fees corresponding to PCT/US2004/017475 mailed Oct. 8, 2004.

Salonen et al., "New Slot Configurations for Dual-Band Planar Inverted-F Antenna", *Microwave and Optical Technology Letters*, 28, 5 pp. 293-298 (Mar. 5, 2001).

International Search Report and Written Opinion for corresponding PCT/US2004/017475, mailing date Feb. 1, 2005.

* cited by examiner

Clamp to range: (Min: 20/ Max: 150)

COMMUNICATIONS STRUCTURES INCLUDING ANTENNAS WITH FILTERS BETWEEN ANTENNA ELEMENTS AND GROUND SHEETS

FIELD OF THE INVENTION

The present invention relates to the field of electronics, and more particularly to antennas for communications structures.

BACKGROUND

When a wireless communications terminal (such as a mobile radiotelephone) is used by a person with a hearing aid, the wireless communications terminal is generally held adjacent to the user's ear during use. The wireless communications terminal is thus held adjacent to the user's hearing aid when the wireless communications device is in use, and electromagnetic radiation generated by the wireless communications terminal (e.g., to radio transmissions during a radiotelephone conversation) may interfere with operation of the hearing aid. Such electromagnetic interference may cause the hearing aid to generate audible buzzing, humming, and/or whining noises. In response, the U.S. Federal Communications Commission (FCC) has enacted regulations to improve hearing aid compatibility (HAC) for hearing impaired users of communications terminals. In particular, limits are placed on electrical and magnetic fields generated in the vicinity of radiotelehpone ear speakers to reduce interference with hearing aids.

SUMMARY

According to some embodiments of the present invention, a communications structure may include a ground sheet, a feed conductor, an antenna, and a filter. The antenna may include an active antenna branch electrically coupled to the feed conductor, and a frequency selective ground sheet extension electrically coupled to the ground sheet. The active antenna branch and the frequency selective ground sheet extension may be spaced apart, and the active antenna branch and the frequency selective ground sheet extension may be arranged along an edge of the ground sheet. The electrical coupling between the active antenna branch and the feed conductor and the electrical coupling between the frequency selective ground sheet extension and the ground sheet may be provided adjacent a same end of the edge of the ground sheet, and the frequency selective ground sheet extension may be at least about 50% of a length of the edge of the ground sheet. Moreover, the filter may be electrically coupled between the frequency selective ground sheet extension and the ground sheet.

A housing may surround the ground sheet, the feed conductor, and the antenna, and a speaker may be ported through an opening in a face of the housing. The frequency selective ground sheet extension may be between portions of the active antenna branch and the face of the housing through which the speaker is ported. A plane may be substantially parallel with respect to the ground sheet and may include a longest segment of the frequency selective ground sheet extension, and the plane may be between an entirety of the active antenna branch and the face of the housing through which the speaker is ported.

The ground sheet may be a conductive layer of a printed circuit board (PCB), and the feed conductor may include a conductive trace of the PCB. According to other embodiments of the present invention, the ground sheet may be provided separate from PCB. A length of the frequency selective ground sheet extension may be at least about 80% of a length of the edge of the ground sheet, and/or the filter may include a band-pass filter configured to pass frequencies in a range of about 1700 MHz to about 2200 MHz. The filter may include an inductive element electrically coupled between the ground sheet and the frequency selective ground sheet extension. The active antenna branch may extend a greater distance from an adjacent edge of the ground sheet than the frequency selective ground sheet extension extends from the adjacent edge of the ground sheet. The frequency selective ground sheet extension may include a segment spaced apart from the ground sheet, and the segment of the frequency selective ground sheet extension may be in a plane parallel to the ground sheet.

An RF transceiver may include an RF transmitter coupled to the feed conductor and an RF receiver coupled to the feed conductor, a user interface may include a speaker and a microphone, and a processor may be coupled between the user interface and the transceiver. The processor may be configured to receive radiotelephone communications through the receiver and to reproduce audio communications using the speaker responsive to the received radiotelephone communications and to generate radiotelephone communications for transmission through the transmitter responsive to audio input received through the microphone.

Portions of the processor, user interface, and/or transceiver may be implemented as electronic components provided on a printed circuit board. A distance between the microphone and the frequency selective ground sheet extension may be less than a distance between the speaker and the frequency selective ground sheet extension. A distance between the microphone and the active antenna branch may be less than a distance between the speaker and the active antenna branch. A segment of the active antenna branch and a segment of the frequency selective ground sheet extension may be spaced apart from the ground sheet, and the segments of the active antenna branch and frequency selective ground sheet extension may be spaced apart from each other by a distance in a range of about 2 mm to about 7 mm.

According to some other embodiments of the present invention, a communications structure may include a ground sheet, a feed conductor, an antenna, and a filter. The antenna may include an active antenna branch electrically coupled to the feed conductor, and a parasitic antenna branch electrically coupled to the ground sheet. The active and parasitic antenna branches may be spaced apart with the active and parasitic antenna branches being arranged along an edge of the ground sheet. The electrical coupling between the active antenna branch and the feed conductor and the electrical coupling between the parasitic antenna branch and the ground sheet may be provided adjacent opposite ends of the edge of the ground sheet. The filter may be electrically coupled between the parasitic antenna branch and the ground sheet.

A length of the parasitic antenna branch may be no more than about 70% of a length of the edge of the ground sheet, and/or the length of the parasitic antenna branch may be provided so that the parasitic antenna branch is tuned to resonate at frequencies of at least about 1700 MHz. Moreover, the filter may include a band-pass filter electrically configured to pass frequencies in a range of about 1700 MHz to about 2200 MHz. The filter may include an inductive element electrically coupled between the ground sheet and the parasitic antenna branch.

The active antenna branch may extend a greater distance from an adjacent edge of the ground sheet than the parasitic antenna branch extends from the adjacent edge of the ground sheet. The parasitic antenna branch may include a segment spaced apart from the ground sheet, and the segment of the parasitic antenna branch may be in a plane parallel to the ground sheet.

A housing may surround the ground sheet, the feed conductor, and the antenna, and a speaker may be ported through an opening in a face of the housing. The parasitic antenna branch may be between portions of the active antenna branch and the face of the housing through which the speaker is ported. A plane may be substantially parallel with respect to the ground sheet and may include a longest segment of the parasitic antenna branch, and the plane may be between an entirety of the active antenna branch and the face of the housing through which the speaker is ported.

An RF transceiver may include an RF transmitter coupled to the feed conductor and an RF receiver coupled to the feed conductor. A user interface may include a speaker and a microphone, and a processor may be coupled between the user interface and the transceiver. The processor may be configured to receive radiotelephone communications through the receiver and to reproduce audio communications using the speaker responsive to the received radiotelephone communications and to generate radiotelephone communications for transmission through the transmitter responsive to audio input received through the microphone.

Portions of the processor, user interface, and/or transceiver may be implemented as electronic components provided on a printed circuit board (PCB). A distance between the microphone and the parasitic antenna branch may be less than a distance between the speaker and the parasitic antenna branch. A distance between the microphone and the active antenna branch may be less than a distance between the speaker and the active antenna branch. A segment of the active antenna branch and a segment of the parasitic antenna branch may be spaced apart from the ground sheet, and the segments of the active and parasitic antenna branches may be spaced apart from each other by a distance in a range of about 2 mm to about 7 mm. Moreover, the ground sheet may include a conductive layer of the PCB, and the feed conductor may include a conductive trace of the PCB. According to other embodiments of the present invention, the ground sheet may be provided separate from PCB.

According to some other embodiments of the present invention, the electrical coupling between the active antenna branch and the feed conductor and the electrical coupling between the parasitic antenna branch and the ground sheet may be provided adjacent a same end of the edge of the PCB and/or the adjacent edge of the ground sheet. For example, the electrical coupling between the active antenna branch and the feed conductor and the electrical coupling between the parasitic antenna branch and the ground sheet may be provided within about 1 cm (or even within about 0.5 cm) of a same end of the edge of the PCB and/or within about 1 cm (or even within about 0.5 cm) of a same end of the adjunct edge of the ground sheet. A length of the parasitic antenna branch may be at least about 80% of a length of the edge of the PCB and/or the adjacent edge of the ground sheet, and according to some embodiments, at least about 90% of the length of the edge of the PCB and/or the adjacent edge of the ground sheet. In addition, a band-pass filter may be electrically coupled between the parasitic antenna branch and the ground sheet, with the band-pass filter being configured to pass frequencies in a range of about 1700 MHz to about 2200 MHz.

As noted above, a band-pass filter may be electrically coupled between the parasitic antenna branch and the ground sheet. More particular, the band-pass filter may include an inductive element and a capacitive element coupled in parallel between the ground sheet and the parasitic antenna branch, and the inductive and capacitive elements may be provided on the PCB. By way of example, the inductive and capacitive elements may be provided as discrete inductive and capacitive elements, such as surface mount devices soldered to the PCB. In addition, a second inductive element may be electrically coupled in series with the capacitive element between the ground sheet and the parasitic antenna branch (in parallel with the first inductive element), and an inductance of the first inductive element may be at least about 3 times (or even about 4 times greater) than an inductance of the second inductive element.

The active antenna branch may include a meander portion spaced apart from the PCB, and legs of the meander portion may intersect a plane parallel to a surface of the PCB. The parasitic antenna branch may include a segment spaced apart from the ground sheet, and the segment of the parasitic antenna branch may be in a plane parallel to the ground sheet. Moreover, the segment of the parasitic antenna branch may be substantially parallel with respect to an adjacent edge of the ground sheet and/or with respect to an adjacent edge of the PCB.

In addition, an RF transceiver may include an RF transmitter coupled to the feed conductor and an RF receiver coupled to the feed conductor. A user interface may include a speaker and a microphone, and a processor may be coupled between the user interface and the transceiver. Moreover, the processor may be configured to receive radiotelephone communications through the receiver and to reproduce audio communications using the speaker responsive to the received radiotelephone communications. The processor may be further configured to generate radiotelephone communications for transmission through the transmitter responsive to audio input received through the microphone.

Portions of the processor, user interface, and/or transceiver may be implemented as electronic components provided on the PCB. Moreover, a distance between the microphone and the parasitic antenna branch may be less than a distance between the speaker and the parasitic antenna branch, and/or a distance between the microphone and the active antenna branch may be less than a distance between the speaker and the active antenna branch. In addition, a segment of the active antenna branch and a segment of the parasitic antenna branch may be spaced apart from the ground sheet, and the segments of the active and parasitic antenna branches may be spaced apart from each other by a distance in a range of about 2 mm to about 7 mm, and according to some embodiments, in a range of about 3 mm to about 5 mm.

BRIEF DESCRIPTION OF THE DRAWINGS

FIG. 3D' is a cross sectional view illustrating a variation of the structure of FIG. 3D according to some embodiments of the present invention.

DETAILED DESCRIPTION

Figure 1:
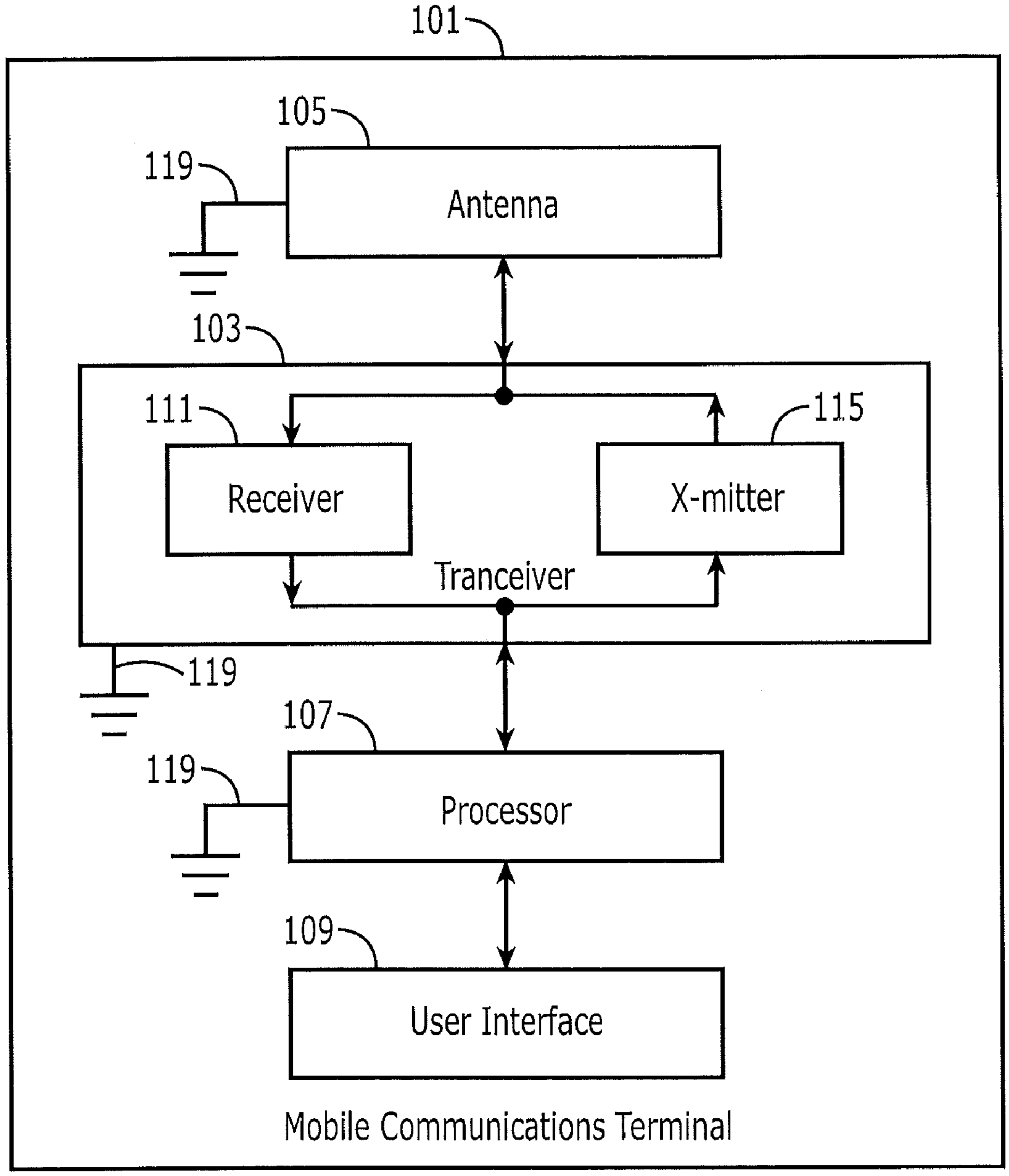
FIG. 1 is a block diagram illustrating communications structures according to some embodiments of the present invention.

Embodiments of the invention will now be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, when an element is referred to as being “coupled” or “connected” to another element, it can be directly coupled or connected to the other element or intervening elements may be present. In contrast, when an element is referred to as being “directly coupled” or “directly connected” to another element, there are no intervening elements present. Like numbers refer to like elements throughout.

Spatially relative terms, such as “above”, “below”, “upper”, “lower” and the like, may be used herein for ease of description to describe one element or feature’s relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as “below” other elements or features would then be oriented “above” the other elements or features. Thus, the exemplary term “below” can encompass both an orientation of above and below. The device may be otherwise oriented (rotated 90 degrees or at other orientations) and the spatially relative descriptors used herein interpreted accordingly. Well-known functions or constructions may not be described in detail for brevity and/or clarity.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

Embodiments of the invention are described herein with reference to schematic illustrations of idealized embodiments of the invention. As such, variations from the shapes and relative sizes of the illustrations as a result, for example, of manufacturing techniques and/or tolerances, are to be expected. Thus, embodiments of the invention should not be construed as limited to the particular shapes and relative sizes of regions illustrated herein but are to include deviations in shapes and/or relative sizes that result, for example, from different operational constraints and/or from manufacturing constraints. Thus, the elements illustrated in the figures are schematic in nature and their shapes are not intended to illustrate the actual shape of a region of a device and are not intended to limit the scope of the invention.

For purposes of illustration and explanation only, various embodiments of the present invention are described herein in the context of multiband wireless (“mobile”) communication terminals (“wireless terminals” or “terminals”) that are configured to carry out cellular communications (e.g., cellular voice and/or data communications) in more than one frequency band. It will be understood, however, that the present invention is not limited to such embodiments and may be embodied generally in any wireless communication terminal that includes a multiband RF antenna that is configured to transmit and receive in two or more frequency bands.

As used herein, the term “multiband” can include, for example, operations in any of the following bands: Advanced Mobile Phone Service (AMPS), ANSI-136, Global Standard for Mobile (GSM) communication, General Packet Radio Service (GPRS), enhanced data rates for GSM evolution (EDGE), DCS, PDC, PCS, code division multiple access (CDMA), wideband-CDMA, CDMA2000, and/or Universal Mobile Telecommunications System (UMTS) frequency bands. GSM operation may include transmission in a frequency range of about 824 MHz to about 849 MHz and reception in a frequency range of about 869 MHz to about 894 MHz. EGSM operation may include transmission in a frequency range of about 880 MHz to about 914 MHz and reception in a frequency range of about 925 MHz to about 960 MHz. DCS operation may include transmission in a frequency range of about 1710 MHz to about 1785 MHz and reception in a frequency range of about 1805 MHz to about 1880 MHz. PDC operation may include transmission in a frequency range of about 893 MHz to about 953 MHz and reception in a frequency range of about 810 MHz to about 885 MHz. PCS operation may include transmission in a frequency range of about 1850 MHz to about 1910 MHz and reception in a frequency range of about 1930 MHz to about 1990 MHz. UMTS operation may include transmission/reception using Band 1 (between 1920 MHz and 1980 MHz and/or between 2110 MHz and 2170 MHz); Band 4 (between 1710 MHz and 1755 MHz and/or between 2110 MHz and 2155 MHz); Band 38 (china: between 2570 MHz and 2620 MHz); Band 40 (china: between 2300 MHz and 2400 MHz); and BT/WLAN (between 2400 MHz and 2485 MHz). Other bands can also be used in embodiments according to the invention. For example, antennas according to some embodiments of the present invention may be tuned to cover additional frequencies such as bands 12, 13, 14, and/or 17 (e.g., between about 698 MHz and 798 MHz). Antennas according to some embodiments of the present invention may be tuned to also cover 1575 MHz GSM, and in such embodiments, a diplexer may be used separate GSM signals (from other signals) for processing in a separate GSM receiver. Antennas according to some embodiments of the present invention may be tuned to also cover frequencies for LTE (Long Term Evolution) operation.

FIG. 1 is a block diagram of a wireless communications terminal 101 (such as a mobile radiotelephone) according to some embodiments of the present invention. Wireless communications terminal 101 may include RF (radio frequency) transceiver 103 coupled between antenna 105 and processor 107. In addition, user interface 109 may be coupled to processor 107, and user interface 109 may include a speaker, a microphone, a display (e.g., an LCD screen), a touch sensitive input (e.g., a touch sensitive display screen, a touch sensitive pad, etc.), a keypad, etc. As further shown in FIG. 1, transceiver 103 may include receiver 111 and transmitter 115, but some embodiments of the present invention may include only a receiver or only a transmitter. Accordingly, processor 107 may be configured to receive radiotelephone communications through receiver 111 and to reproduce audio communications using a speaker of user interface 109 responsive to the received radiotelephone communications, and/or to generate radiotelephone communications for transmission through transmitter 115 responsive to audio input received through the microphone of user interface 109.

Figure 2A:
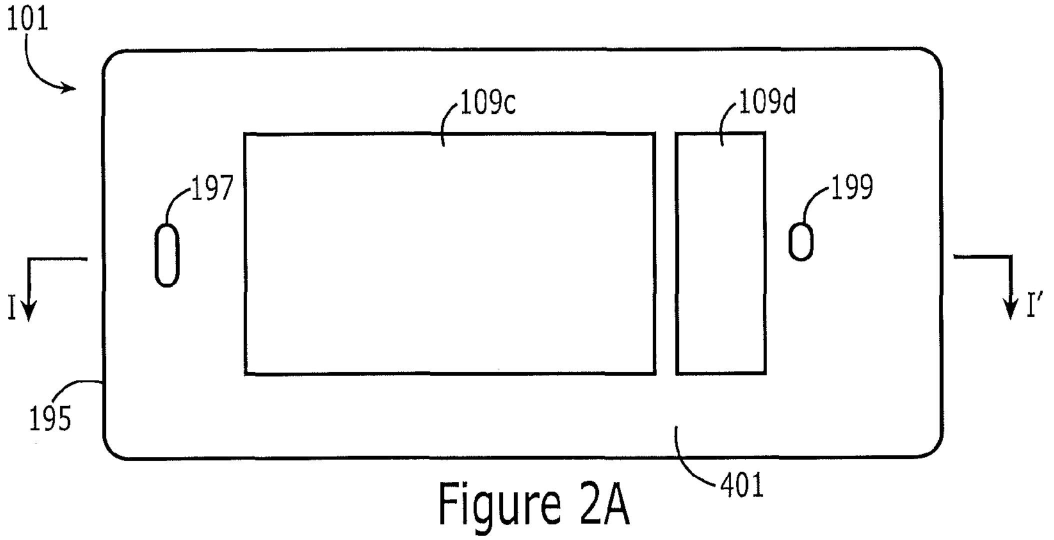
FIG. 2A is a plan view illustrating a mobile communications structures according to some embodiments of the present invention.
Figure 2B:
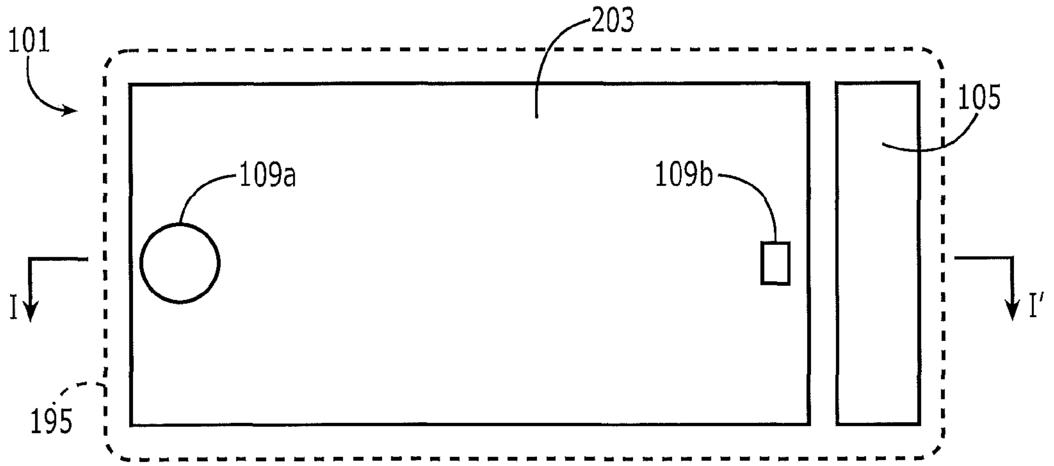
FIG. 2B is a plan view illustrating a printed circuit board (PCB) and antenna of the mobile communications structure of FIG. 2A according to some embodiments of the present invention.
Figure 2C:
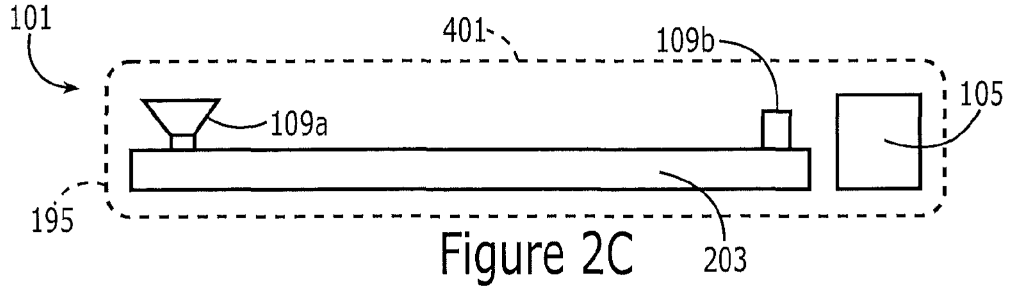
FIG. 2C is a cross-sectional view of the PCB and antenna of the mobile communications structure of FIGS. 2A and 2B taken along section line I-I' according to some embodiments of the present invention.

FIG. 2A is a plan view of a housing 195 of mobile communications terminal 101 of FIG. 1 according to some embodiments of the present invention, and FIGS. 2B and 2C are respective plan and cross sectional views of printed circuit board (PCB) 203 and antenna 105 provided in housing 195. As shown, housing 195 may include respective openings 197 and 199 for speaker 109*a* and microphone 109*b* of user interface 109. A display 109*c* (e.g., a liquid crystal display), a key pad 109*d*, and/or other elements of user interface 109 may be provided on/through housing 195.

As shown in FIGS. 2B and 2C, PCB 203 and antenna 105 may be provided within housing 195. More particularly, portions of antenna 105, processor 107, user interface 109 (e.g., including speaker 109*a*, microphone 109*b*, display 109*c*, key pad 109*d*, etc.), and/or transceiver 103 may be implemented as electronic components (e.g., integrated circuit and/or discrete electronic devices such as resistors, capacitors, inductors, transistors, diodes, etc.) bonded/soldered to PCB 203. Moreover, PCB 203 may include electrically conductive traces at a plurality of different planes thereof providing electrical coupling between electronic components thereon, and an electrically conductive ground sheet may be provided as an electrically conductive ground plane or layer at one or more planes of the PCB 203. Accordingly, each of antenna 105, transceiver 103, processor 107, and/or user interface 109 may be electrically coupled to a common ground sheet or plane as indicated by ground symbols 119 as shown in FIG. 1. While a single PCB is shown by way of example, terminal 101 may include a plurality of PCBs in housing 195. Feed and ground couplings between antenna 105 and PCB 203 are not shown in FIGS. 2A, 2B, and 2C for ease of illustration, but such couplings will be discussed in greater detail below with respect to subsequent figures.

While a ground plane (as a portion of PCB 203) is discussed by way of example, a ground sheet may be provided as a conductive metal sheet/plane/element separate from PCB 203. For example, a ground sheet may be provided as a stamped metal sheet within housing 195 separate from PCB 203, and/or as a conductive element of housing (195) separate from PCB 203. While a ground sheet according to some embodiments of the present invention may be planar, a ground sheet may, for example, conform to a non-planar inside surface of a face of housing 195. A ground sheet/plane, for example, may be provided adjacent face 401 of housing 195 including opening 197 through which speaker 109*a* is ported.

As discussed in greater detail below, antenna 105 may include a active and parasitic antenna branches, and antenna 105 may provide resonances at different frequency bands, such as at frequencies less than about 960 MHZ (e.g. in a range of about 820 MHz to about 960 MHz), and at frequencies greater than about 1700 MHz (e.g., in a range of about 1700 MHz to about 2200 MHz). Antenna 105 may be fed using a coax feed with an interior conductor of the coaxial feed providing electrical coupling between the active antenna branch and transceiver 103 and with an outer conductor of the coaxial feed providing electrical coupling between the parasitic antenna branch and ground 119. Moreover, antenna 105 may be confined within a volume of no more than about 60 mm by 10 mm by 10 mm (e.g., within a volume of about 50 mm by 9 mm by 8 mm) at an end of terminal 101 adjacent microphone 109*b* (and spaced apart from speaker 109*a*). By positioning antenna 105 at an end of terminal 101 spaced apart from speaker 109*a* as shown in FIGS. 2A, 2B, and 2C, electromagnetic radiation emitted by antenna 105 during operation may be less likely to interfere with operation of a user's hearing aid during use with speaker 109*a* adjacent the user's ear. Accordingly, hearing aid compatibility may be improved. Hearing aid compatibility may be further improved by providing antenna 105 with a parasitic antenna branch as discussed in greater detail below.

Figure 3A:
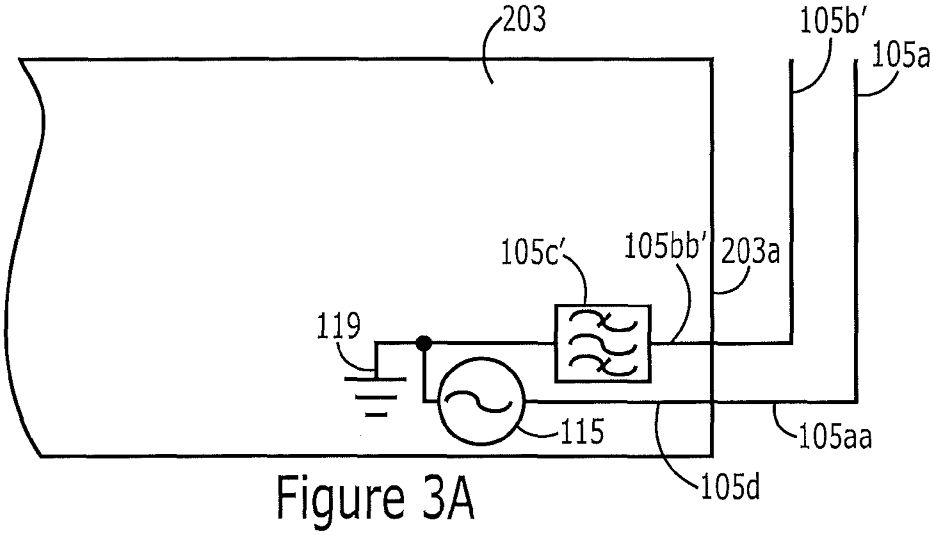
FIG. 3A is a schematic diagram illustrating antenna structures according to some embodiments of the present invention.
Figure 3B:
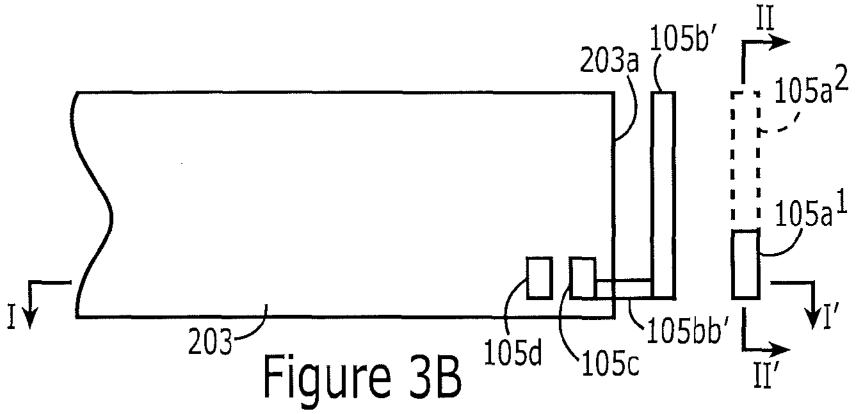
FIGS. 3B and 3C are plan views illustrating antenna structures taken at different planes according to some embodiments of FIG. 3A.
Figure 3C:
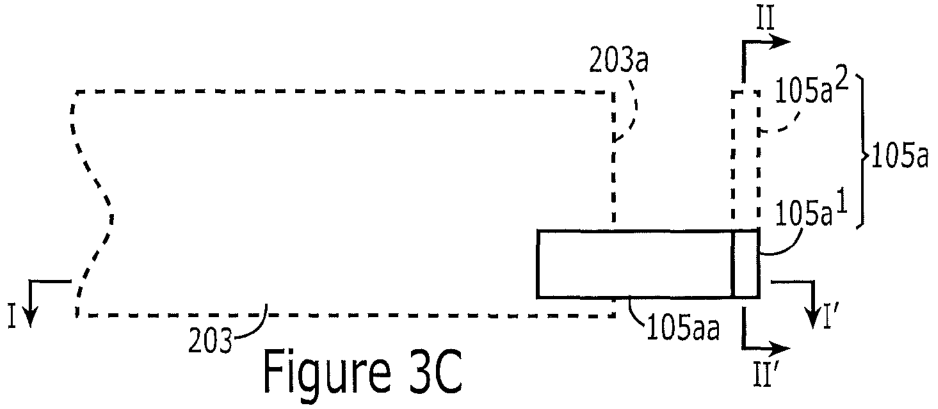
Figure 3D:
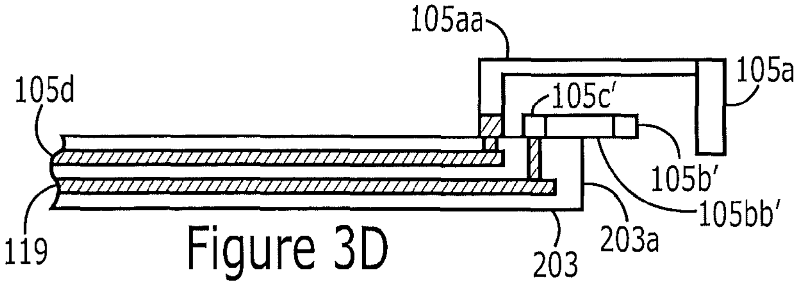
FIG. 3D is a cross sectional view taken along section line I-I' of FIGS. 3B and 3C.
Figure 3D:
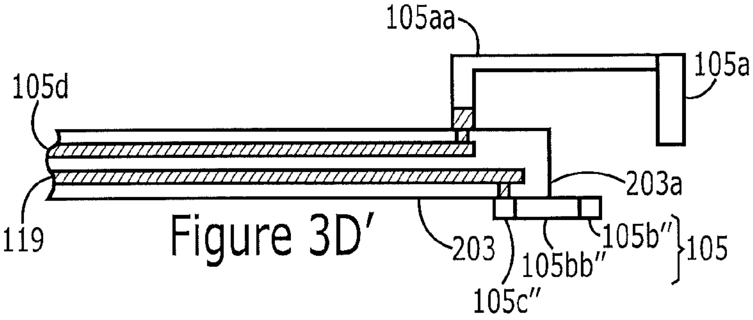
Figure 3E:
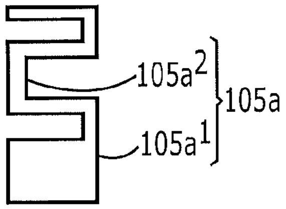
FIG. 3E is a cross sectional view taken along section line II-II' of FIGS. 3B and 3C.

FIG. 3A is a schematic diagram illustrating antenna structures according to some embodiments of the present invention. FIGS. 3B and 3C are plan views illustrating antenna structures taken at different planes according to some embodiments of FIG. 3A. FIG. 3D is a cross sectional view taken along section line I-I' of FIGS. 3B and 3C, and FIG. 3E is a cross sectional view taken along section line II-II' of FIGS. 3B and 3C. As shown, antenna 105 of FIGS. 1, 2B, and 2C may include active antenna branch 105*a* electrically coupled to transmitter 115 through feed conductor 105*d*, and parasitic antenna branch 105*b*' electrically coupled to ground plane 119 through conductor 105*bb*' and band-pass filter 105*c*'. Moreover, active and parasitic antenna branches 105*a* and 105*b*' may be spaced apart with the parasitic antenna branch 105*b*' between portions of active antenna branch 105*a* and ground plane 119 (which may be provided as an electrically conductive plane on PCB 203 and/or as an electrically conductive plane separate from PCB 203) and/or between portions of active antenna branch 105*a* and PCB 203. In addition, conductor 105*aa* may be considered as a portion of active antenna branch 105*a* and/or as a portion of feed conductor 105*d*. Similarly, conductor 105*bb*' may be considered as a portion of parasitic antenna branch 105*b*' and/or as a separate feed conductor for antenna branch 105*b*'.

As shown in FIG. 3E, active antenna branch 105*a* may include elongate and meander patterns 105*a*1 and 105*a*2. While FIG. 3E shows only three legs (horizontal in the orientation of FIG. 3A) of meander pattern 150*a*2 for ease of illustration, many more legs may be provided. Antenna structures including elongate and meander patterns are discussed, for example, in U.S. Pat. No. 7,605,766 to Dahlstrom et al. entitled "Multi-Band Antenna Device For Radio Communication Terminal And Radio Communication Terminal Comprising The Multi-Band Antenna Device", the disclosure of which is hereby incorporated herein in its entirety by reference. Meander pattern 105*a*2 is shown in dashed lines in FIGS. 3B and 3C because meander pattern 105*a*2 is not a continuous segment in the planes illustrated in FIGS. 3B and 3C. PCB 203 is shown with dashed lines in FIG. 3C because PCB 203 is out of the plane illustrated in FIG. 3C. While not explicitly shown, an electrical coupling may also be provided between active antenna branch 105*a* and ground plane 119, and/or active antenna branch 105*a* may include additional conductive segments.

As shown in FIG. 3D, ground plane 119 may include a conductive layer/plane of PCB 203, and feed conductor 105*d* may include a conductive trace and/or via of PCB 203. Moreover, active and parasitic antenna branches 105*a* and 105*b*' may be arranged along an edge 203*a* of PCB 203 most distant from speaker 109*a*. In addition, an electrical coupling (e.g., including conductor 105*aa*) between active antenna branch 105*a* and feed conductor 105*d* and an electrical coupling between parasitic antenna branch 105*b*' and ground plane 119 (e.g., including conductor 105*bb*' and/or band-pass filter 105*c*') may be provided adjacent a same end of edge 203*a* of PCB 203.

A length of parasitic antenna branch 105*b*' may be at least about 80% of a length of edge 203*a* of PCB 203 and/or of a length of an adjacent of ground plane 119, and according to some embodiments, at least about 90% of the length of the edge 203*a* of the PCB 203 and/or of a length of an adjacent edge of ground plane 119. Moreover, active and parasitic antenna branches 105*a* and 105*b*' may both extend along substantially a full length of edge 203*a* of PCB 203 and/or along substantially a full length of an adjacent edge of ground plane 119. Parasitic antenna branch 105*b*' may have a width (in a direction perpendicular to edge 203*a* of PCB 203 as shown in FIG. 3B) of less than about 2 mm, and according to some embodiments, a width of about 1 mm. Parasitic antenna branch 105*b*' may be substantially parallel with respect to edge 203*a* of PCB 203 and/or an adjacent edge of ground plane 119, and parasitic antenna branch 105*b*' may be spaced apart from edge 203*a* and/or from an adjacent edge of ground plane 119 by a distance in a range of about 2 mm to about 7 mm, and according to some embodiments, by a distance in a range of about 3 mm to about 5 mm. Moreover, parasitic antenna branch 105*b*' may be substantially parallel with respect to a plane including active antenna branch 105*a*, and parasitic antenna branch 105*b*' may be between meander portion 105*a*2 of active antenna branch 105*a* and ground plane 119, and/or between elongate portion 105*a*1 of active antenna branch 105*a* and ground plane 119. In addition, legs of meander portion 105*a*2 may be orthogonal with respect to a plane parallel to a surface of PCB 203.

While branch 105*b*' has been referred to as a parasitic branch, branch 105*b*' may be considered as a frequency-selective extension of ground plane 119. Filter 105*c*' may allow active antenna branch 105*a* to interact with extension/branch 105*b*' in high-band frequencies without significantly interacting with extension/branch 105W in low-band frequencies. Because extension/branch 105*b*' (which has been referred to as a parasitic antenna branch) may be non-resonate, effects created by extension/branch 105*b*' may be achieved at any physical length. An effectiveness of extension/branch 105*b*', however, may be increased with a length that is at least about 50% of a width of housing 195 (taken in the vertical direction of FIG. 2A) and/or an edge of ground plane 119 adjacent extension/branch 105*b*', and according to some embodiments, with a length that is at least about 80% of a width of housing 195 (taken in the vertical direction of FIG. 2A) and/or an edge of ground plane 119 adjacent extension/branch 105*b*'.

As shown in FIG. 3D, parasitic antenna branch 105*b*' and conductor 105*bb*' may lie substantially within a plane that is parallel with respect to a surface of PCB 203 and/or ground plane 119. Moreover, an upper surface of PCB 203 (as shown in the orientation of FIG. 3D) may be adjacent a back face of mobile communications terminal 101, and a lower surface of PCB 203 (as shown in the orientation of FIG. 3D) may be adjacent a front face of mobile communications terminal 101 (including opening 197 for speaker 1-9*a*, display 109*c*, and/or keypad 109*d*). Accordingly, parasitic antenna branch 105*b*' may be between portions of active antenna branch 105*a* and a face of housing 195 including opening 197 through which speaker 109*a* is ported.

Figure 3F:
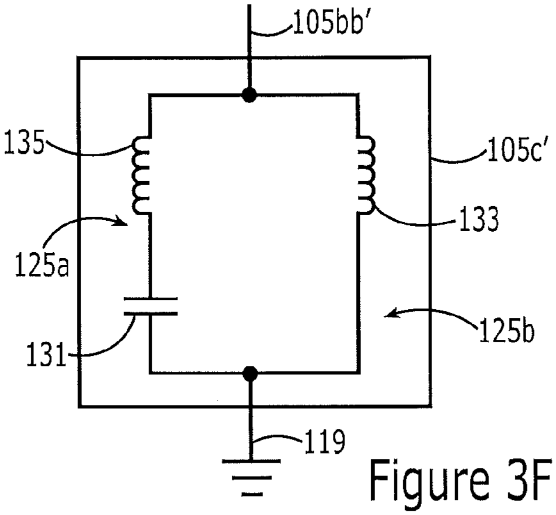
FIG. 3F is a schematic diagram of a pass-band filter according to some embodiments of the present invention.

Active antenna branch 105*a*, for example, may provide multiband performance for communications at frequencies less than about 960 MHZ (e.g. in a range of about 820 MHz to about 960 MHz), and at frequencies greater than about 1700 MHz (e.g., in a range of about 1700 MHz to about 2200 MHz). Moreover, band-pass filter 105*c*' may be configured to pass frequencies in a range of about 1700 MHz to about 2200 MHz and to block frequencies in the range of about 820 MHz to about 960 MHz. As shown in FIG. 3F, band-pass filter 105*c*' may provide electrically parallel paths 125*a* and 125*b* between conductor 105*bb*' and ground plane 119. More particularly, capacitive element 131 and inductive element 133 may be provided in respective parallel paths 125*a* and 125*b*. Moreover, a second inductive element 135 may be provided electrically in series with capacitive element 131 in current path 125*a*. Moreover, elements 131, 133, and/or 135 may be provided as discrete and/or integrated electronic components on PCB 203. By way of example, elements 131, 133, and 135 may be provided as discrete surface mount components that are soldered to conductive traces of PCB 203.

FIG. 3D' is a cross sectional view illustrating a variation of the structure of FIG. 3D according to some embodiments of the present invention with active and parasitic antenna branches 105*a* and 105*b*" coupled to opposite sides of PCB 203. Otherwise, structures of FIGS. 3D and 3D' are the same.

As shown, parasitic antenna branch 105*b*", conductor 105*bb*", and filter 105*c*" may be coupled to a side of PCB adjacent a face of housing 195 including opening 197 ported to speaker 109*a*. As shown in FIG. 3D, parasitic antenna branch 105*b*" and conductor 105*bb*" may lie substantially within a plane that is parallel with respect to a surface of PCB 203 and/or ground plane 119, and this plane may be between an entirety of active antenna branch 105*a* and the face of housing 195 including opening 197 ported to speaker 109*a*. Accordingly, parasitic antenna branch 105*b*" may be closer to the face of housing 195 including opening 197 than any portion active antenna branch 105*a*.

Figure 3G:
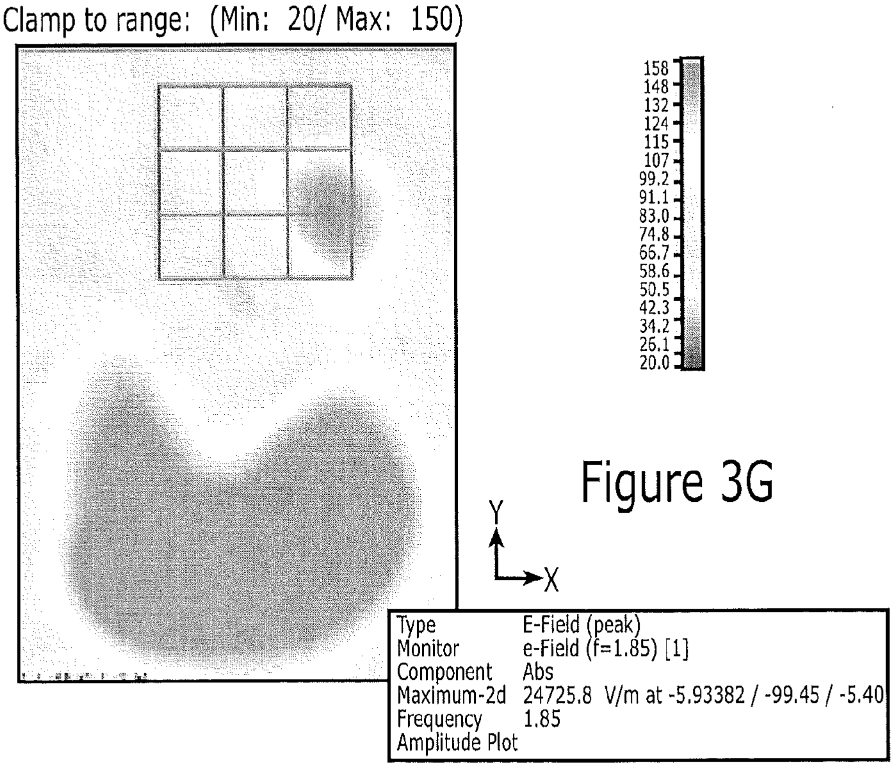
FIGS. 3G and 3H illustrate simulations of electric fields generated by communications structures without and with parasitic antenna structures of FIGS. 3A to 3F.
Figure 3H:
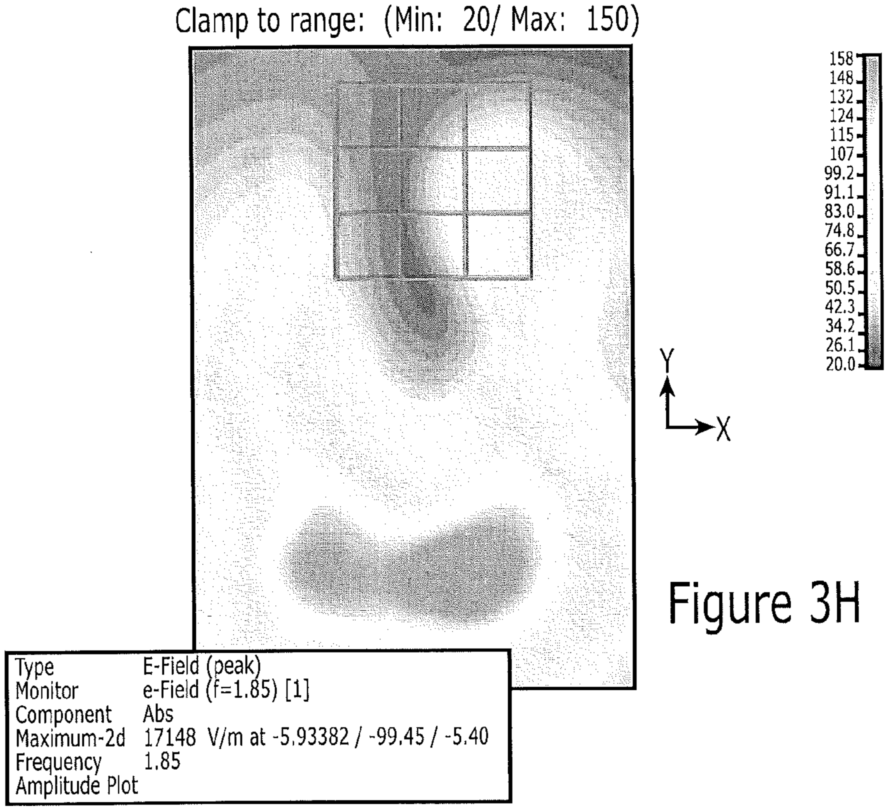

Comparative performances of terminals 101 without and with parasitic antenna branch 105*b*' (and band-pass filter 105*c*') are discussed in greater detail below with respect to FIGS. 3G to 3L. FIG. 3G illustrates simulated electric fields generated by terminal 101 including active antenna branch 105*a* of FIGS. 3A to 3F without parasitic antenna branch 105*b′*, and FIG. 3H illustrates simulated electric fields generated by terminal 101 including active antenna branch 105*a* with parasitic antenna branch 105*b′* and filter 105*c*' of FIGS. 3A to 3F. In FIGS. 3G and 3H, the grid (including 9 squares) represents an area centered around speaker 109*a* where electric fields generated by the antenna are most likely to interfere with operation of a hearing aid, mobile communications terminal 101 is about the width of the grid, and mobile communications terminal 101 extends from about the top of the middle row of squares of the grid down a distance about 7 times a length of one square of the grid. Accordingly, the largest areas of the highest electric fields are adjacent the antenna which is on the bottom of terminal 101 (adjacent microphone 109*b* and most distant from the speaker 109*a*). As shown in FIG. 3H, electric fields in the grid may be reduced by including parasitic antenna branch 105*b′* and pass-band filter 105*c*', thereby improving hearing aid compatibility.

Figure 3I:
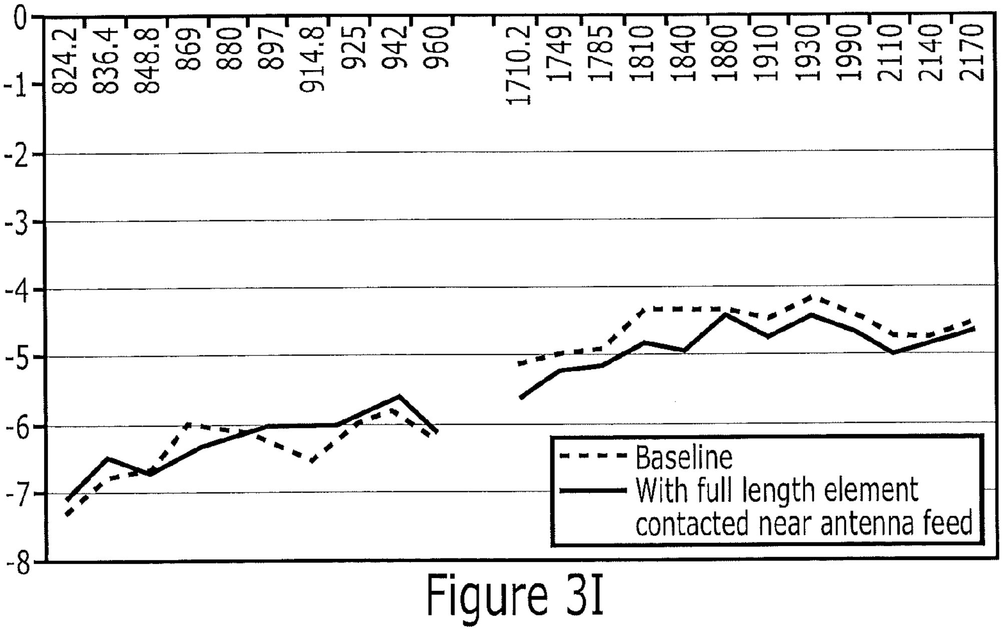
FIG. 3I is a graph illustrating antenna gains as measured on a SAM (Standard Anthropomorphic Model) phantom head for communications structures without and with parasitic antenna structures of FIGS. 3A to 3F.
Figure 3J:
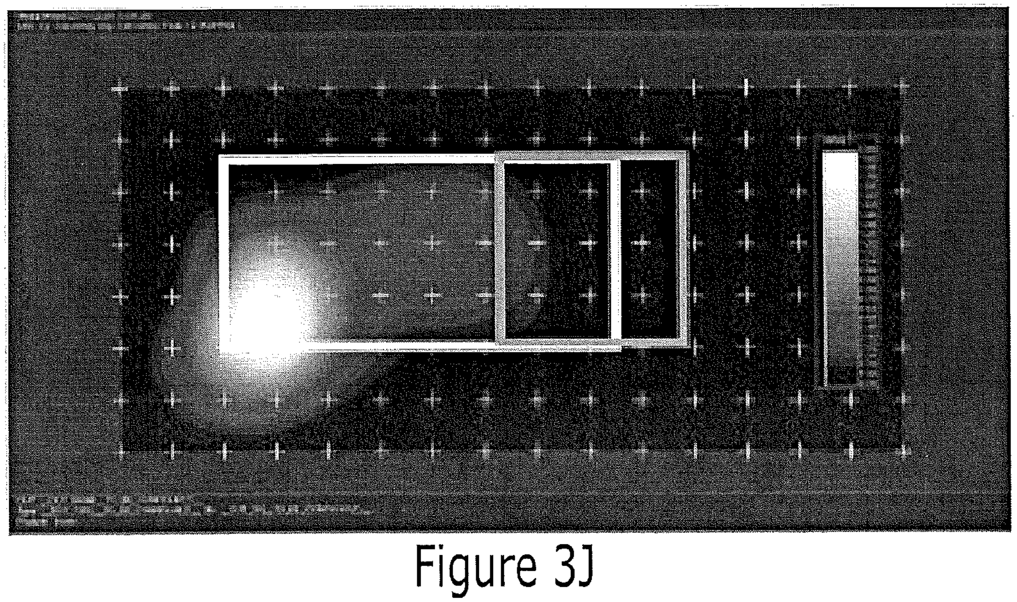
FIGS. 3J and 3K illustrate measurements of electric fields generated by communications structures without and with parasitic antenna structures of FIGS. 3A to 3F.
Figure 3K:
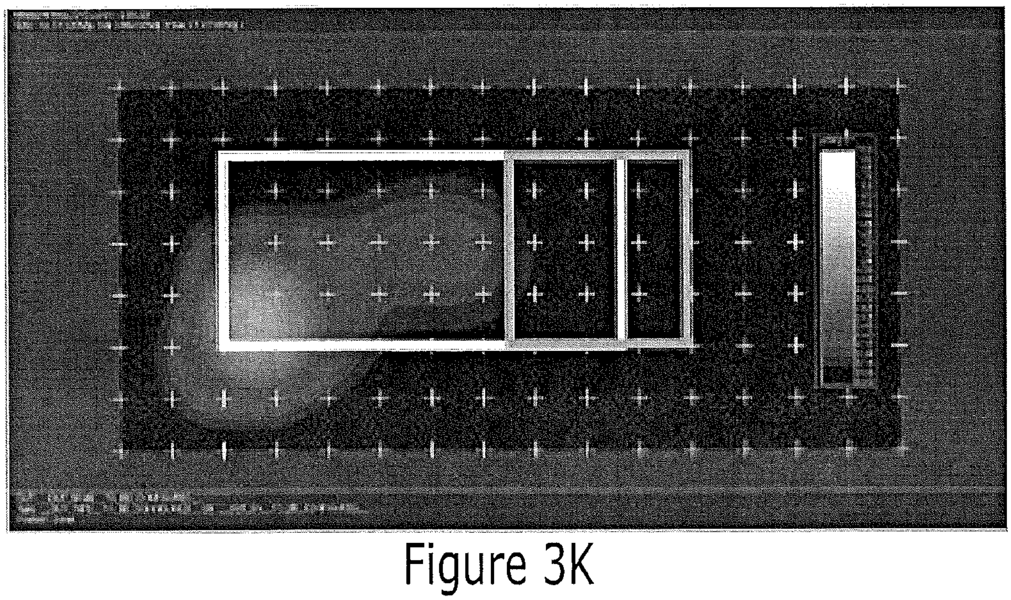

FIG. 3J illustrates measured electric fields generated by terminal 101 including active antenna branch 105*a* of FIGS. 3A to 3F without parasitic antenna branch 105*b′*, and FIG. 3K illustrates measured electric fields generated by terminal 101 including active antenna branch 105*a* with parasitic antenna branch 105*b′* and filter 105*c*' of FIGS. 3A to 3F. In FIGS. 3G and 3H, the square represents an area centered around speaker 109*a* where magnetic fields generated by the antenna are most likely to interfere with operation of a hearing aid, and the overlapping rectangle (extending to the left) represents an outline of mobile terminal 101. Accordingly, the largest areas of the highest magnetic fields are adjacent the antenna which is on a portion of terminal 101 (adjacent microphone 109*b* and most distant from speaker 109*b*). As shown in FIG. 3K, magnetic fields in the square may be reduced by including parasitic antenna branch 105*b′* and pass-band filter 105*c*', thereby improving hearing aid compatibility. More particularly, electric and magnetic fields in the vicinity of the speaker 109*a* may be reduced by about 2 dB.

Figure 3L:
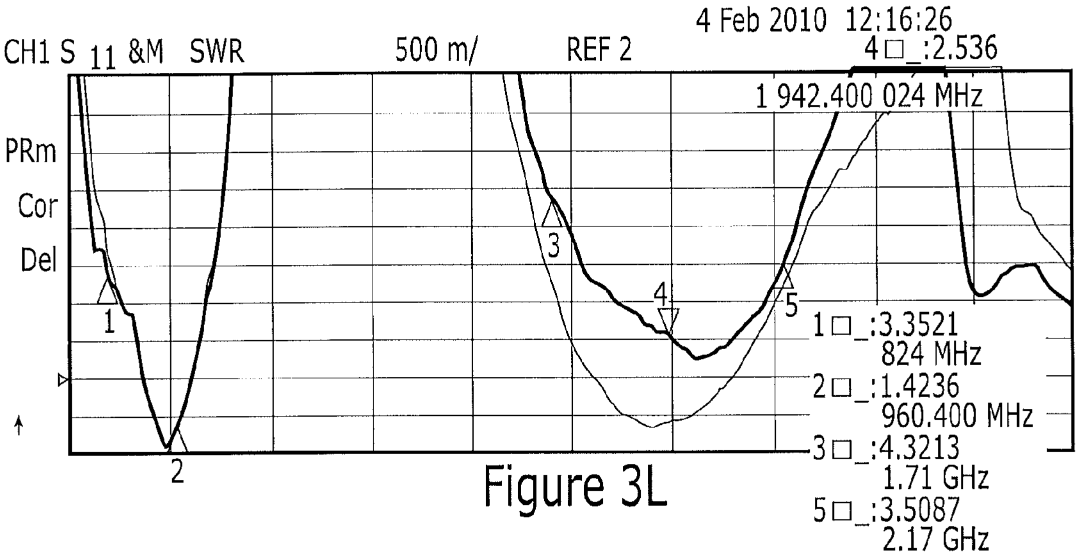
FIG. 3L illustrates voltage standing wave ratio (VSWR) performance for communications structures without and with parasitic antenna structures of FIGS. 3A to 3F.

FIG. 3I shows that there may be insignificant reduction of gain in a lower band of operation when parasitic antenna branch 105*b′* and pass-band filter 105*c*' are added, but that a reduction in gain of about 0.3 dB in the higher band may occur. FIG. 3L provides voltage standing wave ratio (VSWR) plots illustrating performance of terminal 101 without and with parasitic antenna branch 105*b*' and band-pass filter 105*c*' of FIGS. 3A to 3F. As shown, VSWR performance may be reduced and bandwidth may be reduced in a higher band of operation when parasitic antenna branch 105*b′* and band-pass filter 105*c*' are included. In summary, parasitic antenna branch 105*b′* and band-pass filter 105*c*' of FIGS. 3A to 3F may provide improved hearing aid compatibility, but bandwidth, gain, and/or VSWR performance may be reduced.

Efficiency of extension/branch 105*b′* may be increased or decreased by changing physical placement of extension/branch 105*b*' and/or by changing characteristics of filter 105*c*'. More particularly, moving extension/branch 105W toward active antenna branch 105*a* may increase its effect and moving extension/branch 105*b′* away from active antenna branch 105*a* may reduce its effect (both reducing fields and degrading impedance matching in the high-band). Similarly, changing an impedance of filter 105*c*' may reduce its effect and degradation to matching. Changing an impedance of filter 105*c*' may be achieved by changing values (e.g., inductances and/or capacitances) of elements of the LC (inductor/capacitor) filter circuit and/or increasing/reducing resistance of the filter circuit. Using higher Q components may increase an effect provided by extension/branch 105*b′*. Tuning of parasitic resonators is discussed, for example, in U.S. Pat. No. 7,162,264, the disclosure of which is hereby incorporated herein in its entirety by reference.

As discussed above with respect to embodiments of FIGS. 3A-3F, full length parasitic antenna branch 105*b′* may run parallel with a full length of active antenna branch 105*a*, and parasitic antenna branch 105*b*' may be coupled to ground plane 119 through filter 105*c*' (that may be a high-pass or band-pass filter) that is configured to pass high-band frequencies and block low band frequencies. Filter 105*c*', for example, may be configured to block frequencies below about 1000 MHz (e.g., in a range of about 820 MHz to about 960 MHz) and to pass frequencies above about 1500 MHz (e.g., in a range of about 1700 MHz to about 2200 MHz). Accordingly, parasitic antenna branch 105*b′* and filter 105*c*' may positively impact near-field radiation in the high band (thereby reducing interference with hearing aids) without significantly impacting antenna performance in the low band. Such a configuration may effectively provide characteristics of a planar inverted F antenna (PIFA) in the high-band with desired directivity without significantly impacting advantages of a monopole-like structure in the low-band.

Figure 4A:
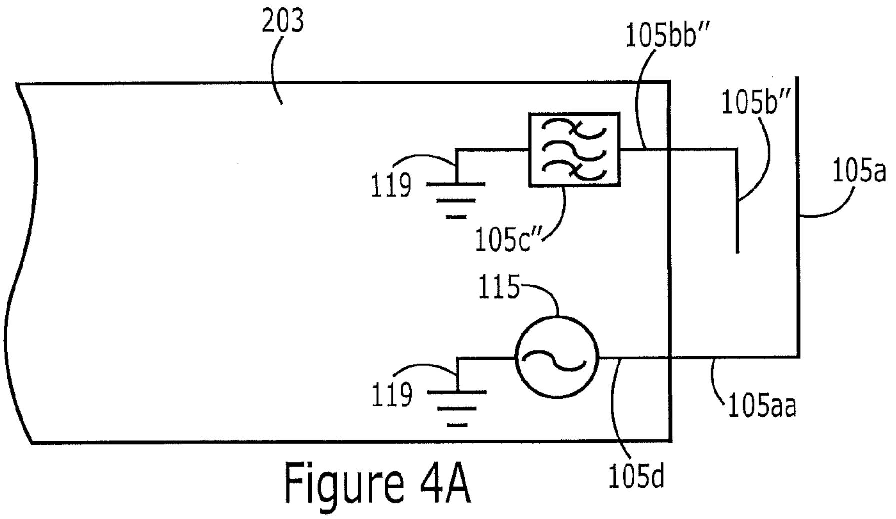
FIG. 4A is a schematic diagram illustrating antenna structures according to some other embodiments of the present invention.
Figure 4B:
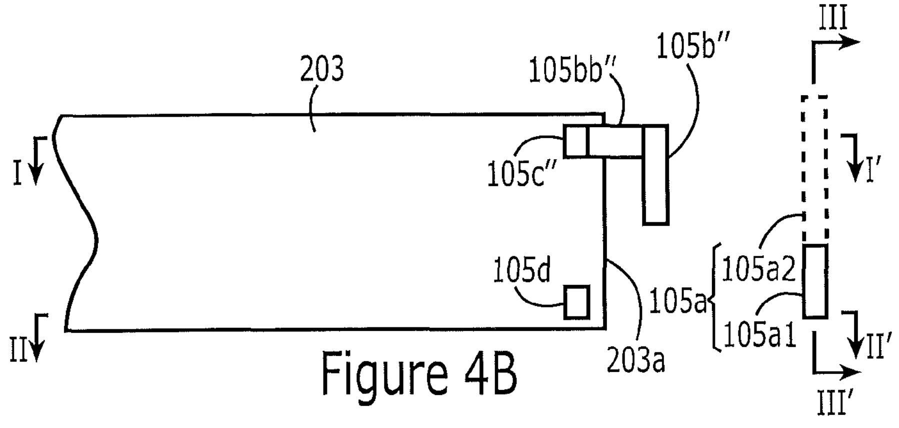
FIGS. 4B and 4C are plan views illustrating antenna structures taken at different planes according to some embodiments of FIG. 4A.
Figure 4C:
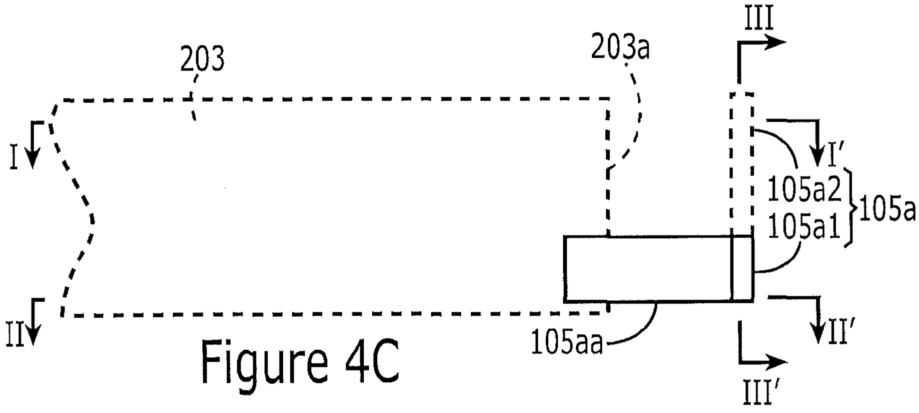
Figure 4D:
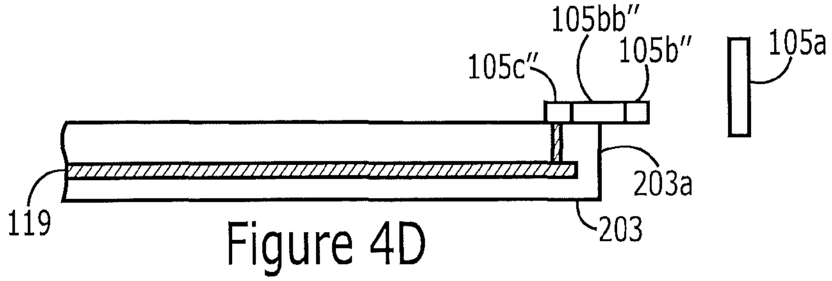
FIG. 4D is a cross sectional view taken along section line I-I' of FIGS. 4B and 4C.
Figure 4E:
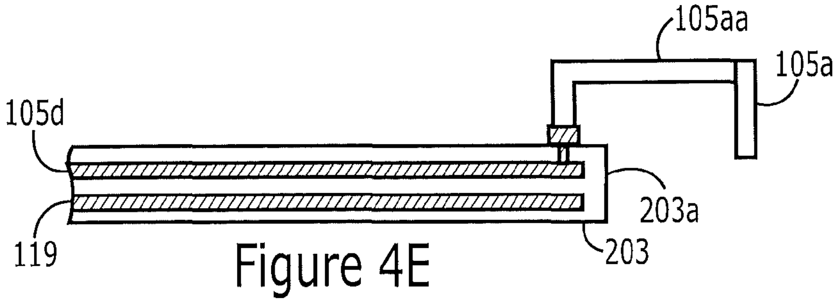
FIG. 4E is a cross sectional view taken along section line II-II' of FIGS. 4B and 4C.
Figure 4F:
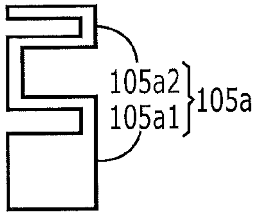
FIG. 4F is a cross sectional view taken along section line III-III' of FIGS. 4B and 4C.

FIG. 4A is a schematic diagram illustrating antenna structures according to some embodiments of the present invention. FIGS. 4B and 4C are plan views illustrating antenna structures taken at different planes according to some embodiments of FIG. 4A. FIG. 4D is a cross sectional view taken along section line I-I' of FIGS. 4B and 4C, FIG. 4E is a cross sectional view taken along section line II-II' of FIGS. 4B and 4C, and FIG. 4F is a cross sectional view taken along section line III-III' of FIGS. 4B and 4C. As shown, antenna 105 of FIGS. 1, 2B, and 2C may include active antenna branch 105*a* electrically coupled to transmitter 115 through feed conductor 105*d*, and parasitic antenna branch 105*b*" electrically coupled to ground plane 119 through conductor 105*bb*" and band-pass filter 105*c*". Moreover, active and parasitic antenna branches 105*a* and 105*b*" may be spaced apart with the parasitic antenna branch 105*b*" between portions of active antenna branch 105*a* and ground plane 119 (provided as an electrically conductive plane on PCB 203) and/or between portions of active antenna branch 105*a* and PCB 203. In addition, conductor 105*aa* may be considered as a portion of active antenna branch 105*a* and/or as a portion of feed conductor 105*d*. Similarly, conductor 105*bb*" may be considered as a portion of parasitic antenna branch 105*b*" and/or as a separate feed conductor for antenna branch 105*b″*.

As shown in FIG. 4F, active antenna branch 105*a* may include elongate and meander patterns 105*a*1 and 105*a*2. While FIG. 4F shows only three legs (horizontal in the orientation of FIG. 4E) of meander pattern 150*a*2 for ease of illustration, many more legs may be provided. Antenna structures including elongate and meander patterns are discussed, for example, in U.S. Pat. No. 7,605,766 to Dahlstrom et al. entitled “Multi-Band Antenna Device For Radio Communication Terminal And Radio Communication Terminal Comprising The Multi-Band Antenna Device”, the disclosure of which is hereby incorporated herein in its entirety by reference. Meander pattern 105_a_2 is shown in dashed lines in FIGS. 4B and 4C because meander pattern 105_a_2 is not a continuous segment in the planes illustrated in FIGS. 4B and 4C. PCB 203 is shown with dashed lines in FIG. 4C because PCB 203 is out of the plane illustrated in FIG. 4C. While not explicitly shown, an electrical coupling may also be provided between active antenna branch 105_a_ and ground plane 119, and/or active antenna branch 105_a_ may include additional conductive segments.

As shown in FIGS. 4D and 4E, ground plane 119 may include a conductive layer/plane of PCB 203, and feed conductor 105_d_ may include a conductive trace and/or via of PCB 203. Moreover, active and parasitic antenna branches 105_a_ and 105_b_" may be arranged along an edge 203_a_ of PCB 203 most distant from speaker 109_a_. In addition, an electrical coupling (e.g., including conductor 105_aa_) between active antenna branch 105_a_ and feed conductor 105_d_ and an electrical coupling between parasitic antenna branch 105_b_" and ground plane 119 (e.g., including conductor 105_bb_" and/or band-pass filter 105_c_") may be provided adjacent opposite ends of edge 203_a_ of PCB 203.

A length of parasitic antenna branch 105_b_" may be no more than about 70% of a length of edge 203_a_ of PCB 203 and/or a length of an adjacent edge of ground plane 119, and according to some embodiments, no more than about 50% of the length of the edge 203_a_ of the PCB 203 and/or a length of an adjacent edge of ground plane 119. More particularly, a length of parasitic antenna branch 105_b_" may be provided so that parasitic antenna branch 105_b_" resonates at a high band of active antenna branch 105_a_. For example, a length of parasitic antenna branch 105_b_" may be provided so that parasitic antenna branch 105_b_" resonates at frequencies greater than about 1700 MHz, and according to some embodiments, at frequencies in a range of about 1700 MHz to about 2200 MHz. Active antenna branch 105_a_ may extend along substantially a full length of edge 203_a_ of PCB 203 and/or along substantially a full length of an adjunct edge of ground plane 119. Parasitic antenna branch 105_b_" may have a width (in a direction perpendicular to edge 203_a_ of PCB 203 as shown in FIG. 4A) of less than about 2 mm, and according to some embodiments, a width of about 1 mm.

Parasitic antenna branch 105_b_" may be substantially parallel with respect to edge 203_a_ of PCB 203 and/or with respect to an adjacent edge of ground plane 119, and parasitic antenna branch 105_b_" may be spaced apart from edge 203_a_ and/or from an adjacent edge of ground plane 119 by a distance in a range of about 2 mm to about 7 mm, and according to some embodiments, by a distance in a range of about 3 mm to about 5 mm. Moreover, parasitic antenna branch 105_b_" may be substantially parallel with respect to a plane including active antenna branch 105_a_, and parasitic antenna branch 105_b_" may be between meander portion 105_a_2 of active antenna branch 105_a_ and ground plane 119. In addition, legs of meander portion 105_a_2 may be orthogonal with respect to a plane parallel to a surface of PCB 203.

As shown in FIGS. 4B-4E, active and parasitic antenna branches 105_a_ and 105_b_" may be coupled to a same side of PCB 119, and parasitic antenna branch 105_b_" may be between portions of active antenna branch 105_a_ and a face of housing 195 including opening 197. According to other embodiments of the present invention, active and parasitic antenna branches 105_a_ and 105_b_" may be coupled to opposite sides of PCB 119 so that parasitic antenna branch 105_b_" is within a plane parallel to a surface of PCT with the plane separating all elements of active antenna branch 105_a_ from a face of housing 195 including opening 197. Parasitic antenna branch 105_b_" may thus be closer to the face of housing 195 including opening 197 than any portion of active antenna element 105_a_.

Figure 4G:
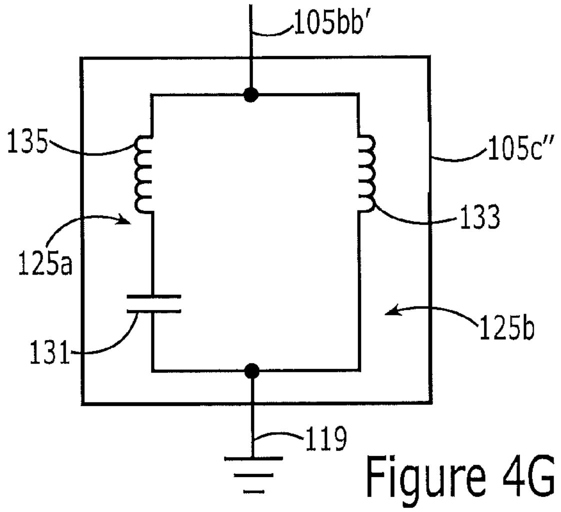
FIG. 4G is a schematic diagram of a pass-band filter according to some embodiments of the present invention.

Active antenna branch 105_a_, for example, may provide multiband performance for communications at frequencies less than about 960 MHZ (e.g. in a range of about 820 MHz to about 960 MHz), and at frequencies greater than about 1700 MHz (e.g., in a range of about 1700 MHz to about 2200 MHz). Moreover, band-pass filter 105_c_" may be configured to pass frequencies in a range of about 1700 MHz to about 2200 MHz and to block frequencies in a range of about 820 MHz to about 960 MHz. As shown in FIG. 4G, band-pass filter 105_c_" may provide electrically parallel paths 125_a_ and 125_b_ between conductor 105_bb_" and ground plane 119. More particularly, capacitive element 131 and inductive element 133 may be provided in respective parallel paths 125_a_ and 125_b_. Moreover, a second inductive element 135 may be provided electrically in series with capacitive element 131 in current path 125_a_. Moreover, elements 131, 133, and/or 135 may be provided as discrete and/or integrated electronic components on PCB 203. By way of example, elements 131, 133, and 135 may be provided as discrete surface mount components that are soldered to conductive traces of PCB 203.

Figure 4H:
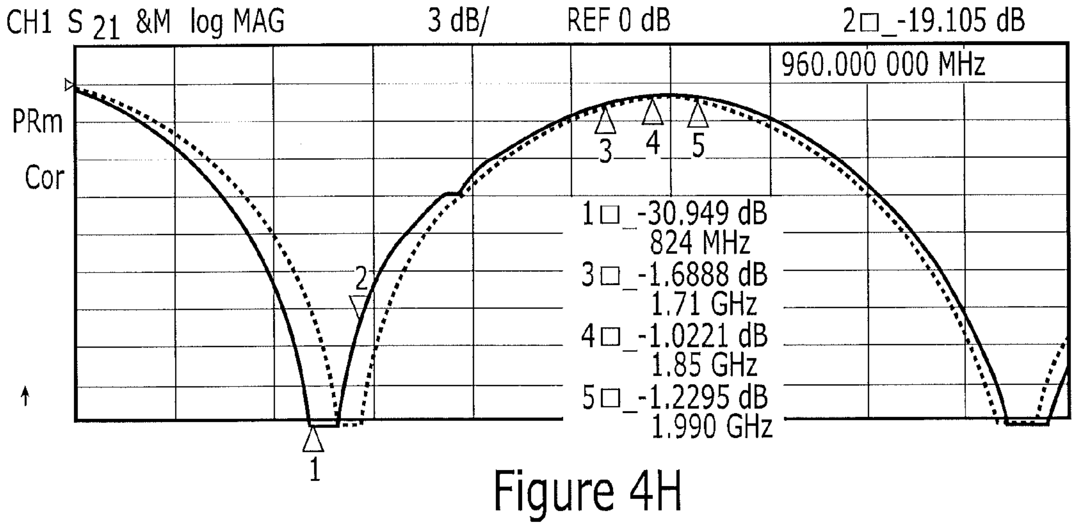
FIG. 4H is a graph illustrating filter performances using different inductive elements according to some embodiments of the present invention.

According to some embodiment of the present invention, band-pass filter 105_c_" may be configured to pass frequencies in a range of about 1700 MHz to about 2200 MHz. For example, capacitive element 131 may be a capacitor having a capacitance of about 0.5 pF, inductive element 135 may be an inductor having an inductance of about 10 nH, and inductive element 133 may be an inductor selected to tune band-pass filter 105_c_". FIG. 4H is a graph illustrating gains for filter 105_c_" with different inductors (i.e., 39 nH and 47 nH) selected for inductive element 133 (using an 0.5 pF capacitor for element 131 and using a 10 nH inductor for element 135). As shown in FIG. 4H, the higher inductive value (47 nH) for inductive element 133 may provide a wider pass-band for filter 105_c_", and the lower inductive value (39 nH) for inductive element 133 may provide a narrower pass-band for filter 105_c_". Moreover, using a 47 nH inductor for element 133, filter 105_c_" may provide about a 1.5 dB loss in the high band (e.g., in a range of about 1700 MHz to about 2200 MHz) while providing about a 20 dB loss or greater in the low band (e.g., in a range of about 820 MHz to about 960 MHz). Use of filter 105_c_" together with parasitic element 105_b_" may provide increased directivity for high band transmissions without significantly impacting low-band performance. All inductor values presented herein are provided for inductors having multi-layer construction. If wire-wound or other higher-Q components are used, corresponding inductor values may be increased to provide the same resonance characteristics.

Figure 4I:
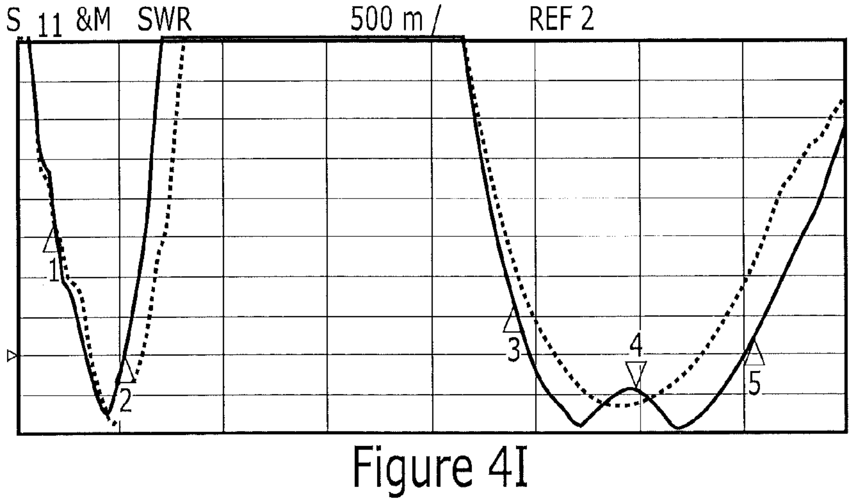
FIG. 4I illustrates voltage standing wave ratio (VSWR) performance for terminals without and with parasitic antenna structures of FIGS. 4A to 4G.

Comparative performances of terminals 101 without and with parasitic antenna branch 105_b_" (and band-pass filter 105_c_") are discussed in greater detail below with respect to FIGS. 4I to 4N. FIG. 4K illustrates simulated electric fields generated by terminal 101 including active antenna branch 105_a_ of FIGS. 4A to 4G without parasitic antenna branch 105_b_", and FIG. 4L illustrates simulated electric fields generated by terminal 101 including active antenna branch 105_a_ with parasitic antenna branch 105_b_" and filter 105_c_" of FIGS. 4A to 4G. In FIGS. 4K and 4L, the grid (including 9 squares) represents an area centered around speaker 109_a_ where electric fields generated by the antenna are most likely to interfere with operation of a hearing aid. Mobile communications terminal 101 is about the width of the grid, and mobile communications terminal 101 extends from about the top of the middle row of squares of the grid down a distance about 7 times a length of one square of the grid. Accordingly, the largest areas of the highest electric fields are adjacent the antenna which is on the bottom of terminal 101 (adjacent microphone 109*b* and most distant from the speaker 109*a*). As shown in FIG. 4L, electric fields in the grid may be reduced (e.g., by about 0.7 dB) by including parasitic antenna branch 105*b*" and pass-band filter 105*c*", thereby improving hearing aid compatibility.

Figure 4J:
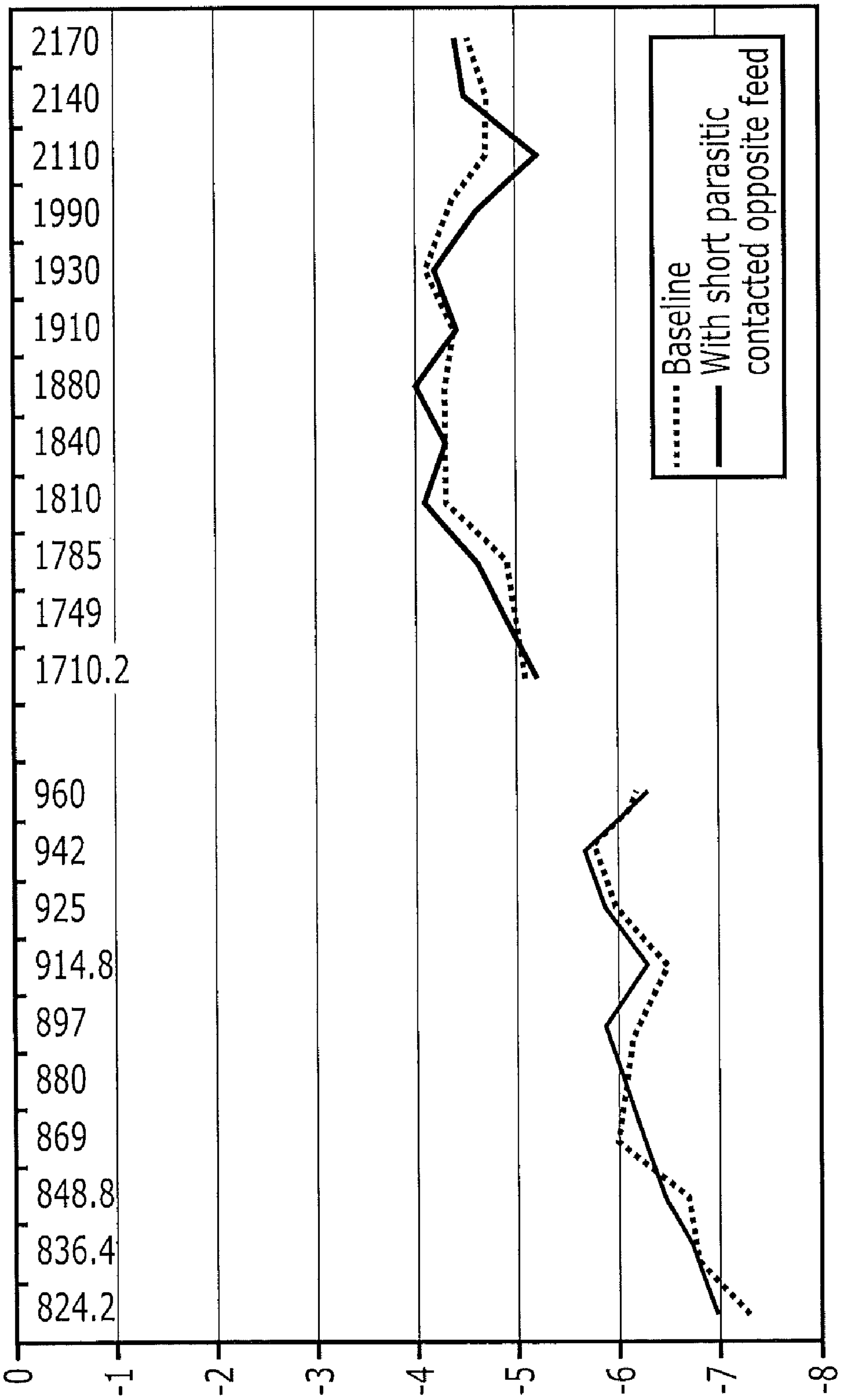
FIG. 4J is a graph illustrating antenna gains as measured on a SAM (Standard Anthropomorphic Model) phantom head for communications structures without and with parasitic antenna structures of FIGS. 4A to 4G.
Figure 4K:
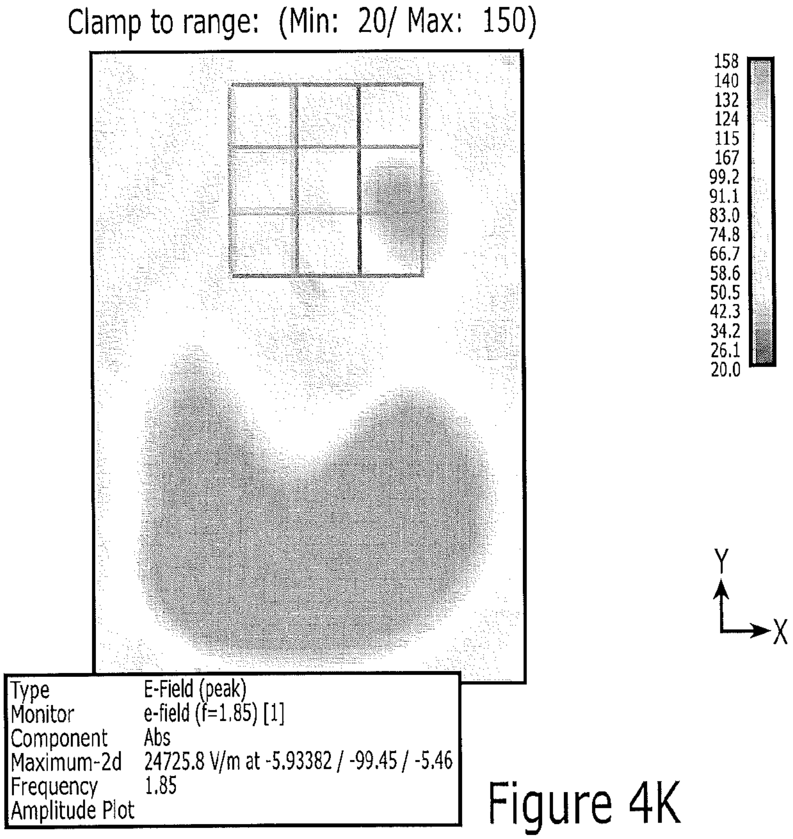
FIGS. 4K and 4L illustrate simulations of electric fields generated by communications structures without and with parasitic antenna structures of FIGS. 4A to 4G.
Figure 4L:
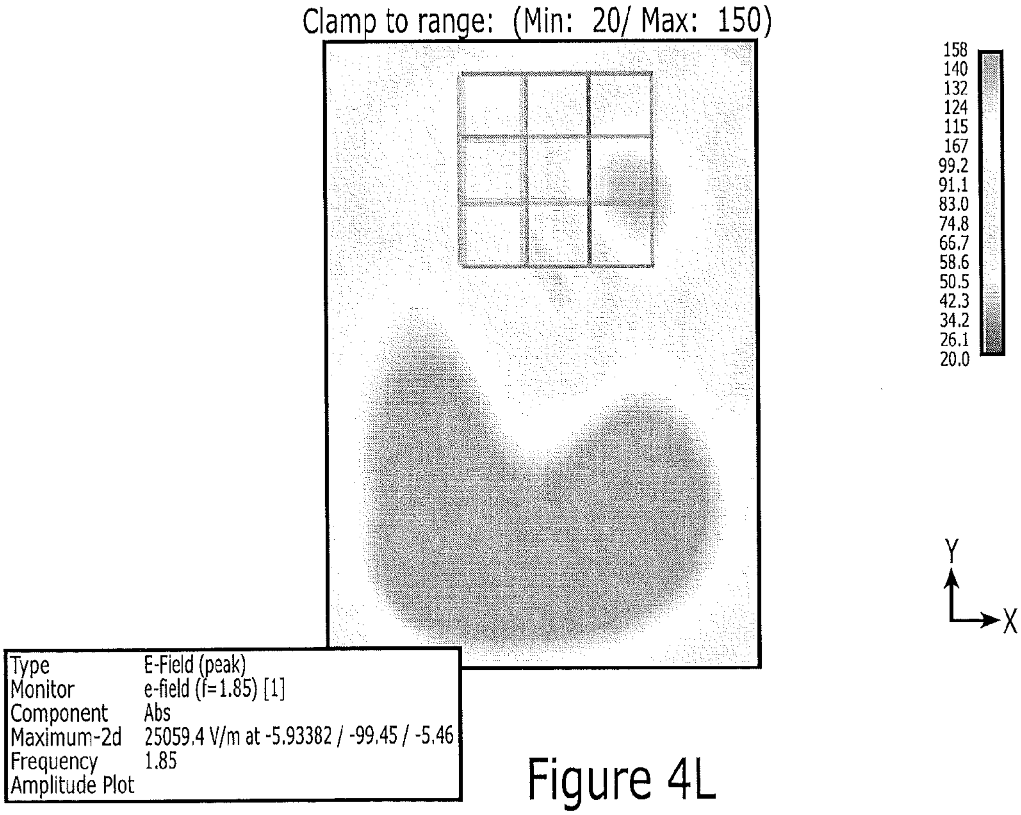
Figure 4M:
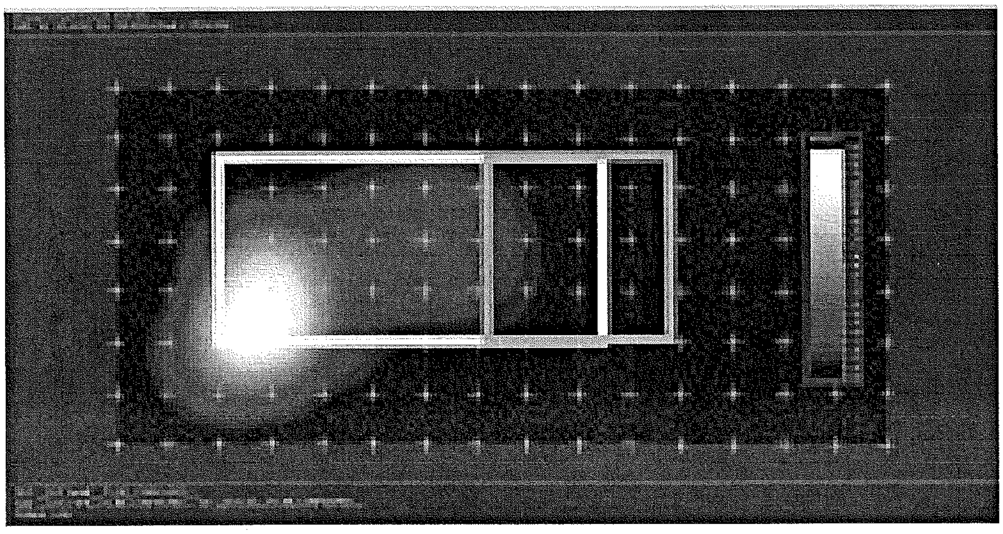
FIGS. 4M and 4N illustrate measurements of electric fields generated by communications structures without and with parasitic antenna structures of FIGS. 4A to 4G.
Figure 4N:
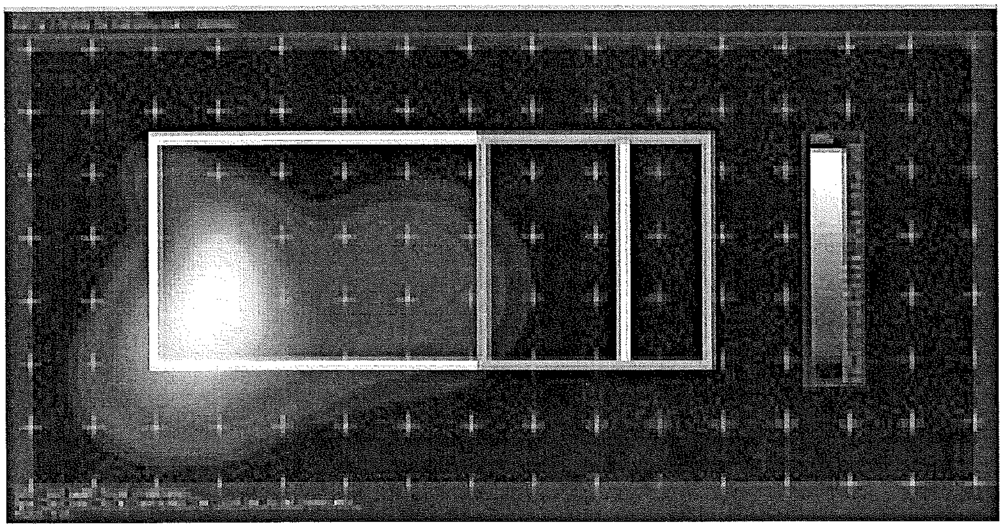

FIG. 4M illustrates measured electric fields generated by terminal 101 including active antenna branch 105*a* of FIGS. 4A to 4G without parasitic antenna branch 105*b*", and FIG. 4N illustrates measured electric fields generated by terminal 101 including active antenna branch 105*a* with parasitic antenna branch 105*b*" and filter 105*c*" of FIGS. 4A to 4G. In FIGS. 4M and 4N, the square represents an area centered around speaker 109*a* where magnetic fields generated by the antenna are most likely to interfere with operation of a hearing aid, and the overlapping rectangle (extending to the left) represents an outline of mobile terminal 101. Accordingly, the largest areas of the highest magnetic fields are adjacent the antenna which is on a portion of terminal 101 (adjacent microphone 109*b* and most distant from speaker 109*b*). As shown in FIG. 4N, magnetic fields in the square may be reduced by including parasitic antenna branch 105*b*' and pass-band filter 105*c*", thereby improving hearing aid compatibility. Accordingly, electric and magnetic fields in the vicinity of the speaker 109*a* may be reduced.

FIG. 4J shows that there may be some reduction of gain in a lower band of operation when parasitic antenna branch 105*b*' and pass-band filter 105*c*" are added, and that some improvement in gain may occur in the higher band. FIG. 4I provides voltage standing wave ratio (VSWR) plots illustrating performance of terminal 101 without and with parasitic antenna branch 105*b*" and band-pass filter 105*c*" of FIGS. 4A to 4G. As shown, VSWR performance may be improved and bandwidth may be improved (with an additional peak) in a higher band of operation when parasitic antenna branch 105*b*" and band-pass filter 105*c*" are included. In a lower band of operation, however, bandwidth may be slightly reduced. In summary, parasitic antenna branch 105*b*" and band-pass filter 105*c*" of FIGS. 4A to 4G may provide improved hearing aid compatibility and improved performance in the high band, but bandwidth, gain, and/or VSWR performance may be somewhat reduced in the low band.

As discussed above with respect to embodiments of FIGS. 4A-4G, parasitic antenna branch 105*b*" may be tuned to high-band frequencies and placed to couple with an end of active antenna branch 105*a* spaced apart from a feed coupling to active antenna branch 105*b*". Moreover, parasitic antenna branch 105*b*" may be coupled to ground plane 119 through filter 105*c*" (that may be a high-pass or band-pass filter) that is configured to pass high-band frequencies and block low band frequencies. Filter 105*c*", for example, may be configured to block frequencies below about 1000 MHz (e.g., in a range of about 820 MHz to about 960 MHz) and to pass frequencies above about 1500 MHz (e.g., in a range of about 1700 MHz to about 2200 MHz). Accordingly, parasitic antenna branch 105*b*" and filter 105*c*" may positively impact near-field radiation in the high band (thereby reducing interference with hearing aids) without significantly impacting antenna performance in the low band. Such a configuration may effectively provide characteristics of a planar inverted F antenna (PIFA) in the high-band with desired directivity without significantly impacting advantages of a monopole-like structure in the low-band.

Many alterations and modifications may be made by those having ordinary skill in the art, given the benefit of present disclosure, without departing from the spirit and scope of the invention. For example, antennas according to embodiments of the invention may have various shapes, configurations, and/or sizes and are not limited to those illustrated. Therefore, it must be understood that the illustrated embodiments have been set forth only for the purposes of example, and that it should not be taken as limiting the invention as defined by the following claims. The following claims are, therefore, to be read to include not only the combination of elements which are literally set forth but all equivalent elements for performing substantially the same function in substantially the same way to obtain substantially the same result. The claims are thus to be understood to include what is specifically illustrated and described above, what is conceptually equivalent, and also what incorporates concepts of the invention.

That which is claimed is:

1. A communications structure comprising:

a ground sheet;

a feed conductor;

an antenna including an active antenna branch electrically coupled to the feed conductor, and a frequency selective ground sheet extension electrically coupled to the ground sheet, wherein the active antenna branch and the frequency selective ground sheet extension are spaced apart, wherein the active antenna branch and the frequency selective ground sheet extension are arranged along an edge of the ground sheet, wherein the electrical coupling between the active antenna branch and the feed conductor and the electrical coupling between the frequency selective ground sheet extension and the ground sheet are provided adjacent a same end of the edge of the ground sheet, and wherein the frequency selective ground sheet extension is at least about 50% of a length of the edge of the ground sheet; and a filter electrically coupled between the frequency selective ground sheet extension and the ground sheet.

2. A communications structure according to claim 1 further comprising:

a housing surrounding the ground sheet, the feed conductor, and the antenna;

a speaker ported through an opening in a face of the housing, wherein the frequency selective ground sheet extension is between portions of the active antenna branch and the face of the housing through which the speaker is ported.

3. A communications structure according to claim 2 wherein a plane substantially parallel with respect to the ground sheet and including a longest segment of the frequency selective ground sheet extension is between an entirety of the active antenna branch and the face of the housing through which the speaker is ported.

4. A communications structure according to claim 1 further comprising:

a printed circuit board (PCB), wherein the ground sheet comprises a conductive layer of the PCB, and wherein the feed conductor comprises a conductive trace of the PCB.

5. A communications structure according to claim 1 wherein a length of the frequency selective ground sheet extension is at least about 80% of a length of the edge of the ground sheet.

6. A communications structure according to claim 1 wherein the filter comprises a band-pass filter configured to pass frequencies in a range of about 1700 MHz to about 2200 MHz.

7. A communications structure according to claim 1 wherein the filter comprises an inductive element electrically coupled between the ground sheet and the frequency selective ground sheet extension.

8. A communications structure according to claim 1 wherein the active antenna branch extends a greater distance from an adjacent edge of the ground sheet than the frequency selective ground sheet extension extends from the adjacent edge of the ground sheet.

9. A communications structure according to claim 1 wherein the frequency selective ground sheet extension includes a segment spaced apart from the ground sheet, and wherein the segment of the frequency selective ground sheet extension is in a plane parallel to the ground sheet.

10. A communications structure according to claim 1, further comprising:

an RF transceiver including an RF transmitter coupled to the feed conductor and an RF receiver coupled to the feed conductor;

a user interface including a speaker and a microphone; and a processor coupled between the user interface and the transceiver, wherein the processor is configured to receive radiotelephone communications through the receiver and to reproduce audio communications using the speaker responsive to the received radiotelephone communications and to generate radiotelephone communications for transmission through the transmitter responsive to audio input received through the microphone.

11. A communications structure comprising:

a ground sheet;

a feed conductor;

an antenna including an active antenna branch electrically coupled to the feed conductor, and a parasitic antenna branch electrically coupled to the ground sheet, wherein the active and parasitic antenna branches are spaced apart wherein the active and parasitic antenna branches are arranged along an edge of the ground sheet, and wherein the electrical coupling between the active antenna branch and the feed conductor and the electrical coupling between the parasitic antenna branch and the ground sheet are provided adjacent opposite ends of the edge of the ground sheet; and a filter electrically coupled between the parasitic antenna branch and the ground sheet.

12. A communications structure according to claim 11 wherein a length of the parasitic antenna branch is no more than about 70% of a length of the edge of the ground sheet.

13. A communications structure according to claim 12 wherein the length of the parasitic antenna branch is provided so that the parasitic antenna branch is tuned to resonate at frequencies of at least about 1700 MHz.

14. A communications structure according to claim 13 wherein the filter comprises a band-pass filter electrically configured to pass frequencies in a range of about 1700 MHz to about 2200 MHz.

15. A communications structure according to claim 11 wherein the filter comprises an inductive element electrically coupled between the ground sheet and the parasitic antenna branch.

16. A communications structure according to claim 11 wherein the active antenna branch extends a greater distance from an adjacent edge of the ground sheet than the parasitic antenna branch extends from the adjacent edge of the ground sheet.

17. A communications structure according to claim 11 wherein the parasitic antenna branch includes a segment spaced apart from the ground sheet, and wherein the segment of the parasitic antenna branch is in a plane parallel to the ground sheet.

18. A communications structure according to claim 11 further comprising:

a housing surrounding the ground sheet, the feed conductor, and the antenna;

a speaker ported through an opening in a face of the housing, wherein the parasitic antenna branch is between portions of the active antenna branch and the face of the housing through which the speaker is ported.

19. A communications structure according to claim 18 wherein a plane substantially parallel with respect to the ground sheet and including a longest segment of the parasitic antenna branch is between an entirety of the active antenna branch and the face of the housing through which the speaker is ported.

20. A communications structure according to claim 11, further comprising:

an RF transceiver including an RF transmitter coupled to the feed conductor and an RF receiver coupled to the feed conductor;

a user interface including a speaker and a microphone; and a processor coupled between the user interface and the transceiver, wherein the processor is configured to receive radiotelephone communications through the receiver and to reproduce audio communications using the speaker responsive to the received radiotelephone communications and to generate radiotelephone communications for transmission through the transmitter responsive to audio input received through the microphone.

* * * * *

UNITED STATES PATENT AND TRADEMARK OFFICE

CERTIFICATE OF CORRECTION

PATENT NO. : 8,108,021 B2
APPLICATION NO. : 12/788714
DATED : January 31, 2012
INVENTOR(S) : Vance It is certified that error appears in the above-identified patent and that said Letters Patent is hereby corrected as shown below:

In the Patent:

Column 13, Line 6: Please correct "extension/branch 105W"
to read -- extension/branch 105b′ --

Signed and Sealed this
Fifteenth Day of May, 2012

David J. Kappos
*Director of the United States Patent and Trademark Office*